United States Patent
Urbach

(10) Patent No.: US 11,093,024 B2
(45) Date of Patent: Aug. 17, 2021

(54) GENERATING AND PROVIDING IMMERSIVE EXPERIENCES TO USERS ISOLATED FROM EXTERNAL STIMULI

(71) Applicant: OTOY, INC., Los Angeles, CA (US)

(72) Inventor: Julian Michael Urbach, Los Angeles, CA (US)

(73) Assignee: OTOY, INC., Los Angeles, CA (US)

( * ) Notice: Subject to any disclaimer, the term of this patent is extended or adjusted under 35 U.S.C. 154(b) by 0 days.

(21) Appl. No.: 16/562,586

(22) Filed: Sep. 6, 2019

(65) Prior Publication Data

US 2019/0391636 A1 Dec. 26, 2019

Related U.S. Application Data

(63) Continuation of application No. 14/717,587, filed on May 20, 2015, now Pat. No. 10,409,361.

(60) Provisional application No. 62/007,226, filed on Jun. 3, 2014.

(51) Int. Cl.
*G06F 3/01* (2006.01)

(52) U.S. Cl.
CPC .............. *G06F 3/011* (2013.01); *G06F 3/013* (2013.01); *G06F 3/015* (2013.01); *G06F 3/016* (2013.01)

(58) Field of Classification Search
CPC .......... G06F 3/011; G06F 3/015; G06F 3/013; G06F 3/016
See application file for complete search history.

(56) References Cited

U.S. PATENT DOCUMENTS

| | | |
|---|---|---|
| 2004/0061663 A1 | 4/2004 | Reynolds et al. |
| 2008/0125834 A1 | 5/2008 | Hendrix et al. |
| 2009/0032267 A1 | 2/2009 | Cavender et al. |
| 2009/0322671 A1 | 12/2009 | Scott et al. |
| 2010/0128112 A1* | 5/2010 | Marti ............... G06F 3/011 348/51 |
| 2011/0006978 A1* | 1/2011 | Yuan ............... G06F 3/013 345/156 |
| 2011/0023175 A1 | 1/2011 | Bunn |
| 2011/0231757 A1 | 9/2011 | Haddick et al. |

(Continued)

FOREIGN PATENT DOCUMENTS

EP 0128641 A2 12/1984

OTHER PUBLICATIONS

International Search Report to corresponding International Application No. PCT/US15/33560, dated Aug. 26, 2015.

(Continued)

*Primary Examiner* — Alexander Eisen
*Assistant Examiner* — Kebede T Teshome
(74) *Attorney, Agent, or Firm* — James J. DeCarlo; Greenberg Traurig, LLP

(57) ABSTRACT

An immersive experience system provides interactive content to a user while isolating the user from external stimuli in an isolation chamber. The user floats in a high-density suspension liquid maintained at the user's body temperature while consuming the interactive content which can provide audio, video and tactile inputs to the user. The user can interact with the immersive experience system via different modalities such as eye movements or gestures or via providing thought input through a visual cortex thought recorder comprised in the immersive experience system.

15 Claims, 20 Drawing Sheets

(56) References Cited

U.S. PATENT DOCUMENTS

2012/0101402 A1* 4/2012 Nguyen .................... A61F 4/00
                                                        600/544
2013/0185144 A1   7/2013 Pradeep et al.
2014/0001206 A1   1/2014 Hoefler
2014/0012068 A1*  1/2014 Hoefler .................. A61H 33/04
                                                        600/21
2015/0141741 A1   5/2015 Sullivan
2015/0309562 A1* 10/2015 Shams .................... G06F 3/011
                                                        345/8

OTHER PUBLICATIONS

Official Action to corresponding TW Application No. 104116939, dated Aug. 31, 2016.

* cited by examiner

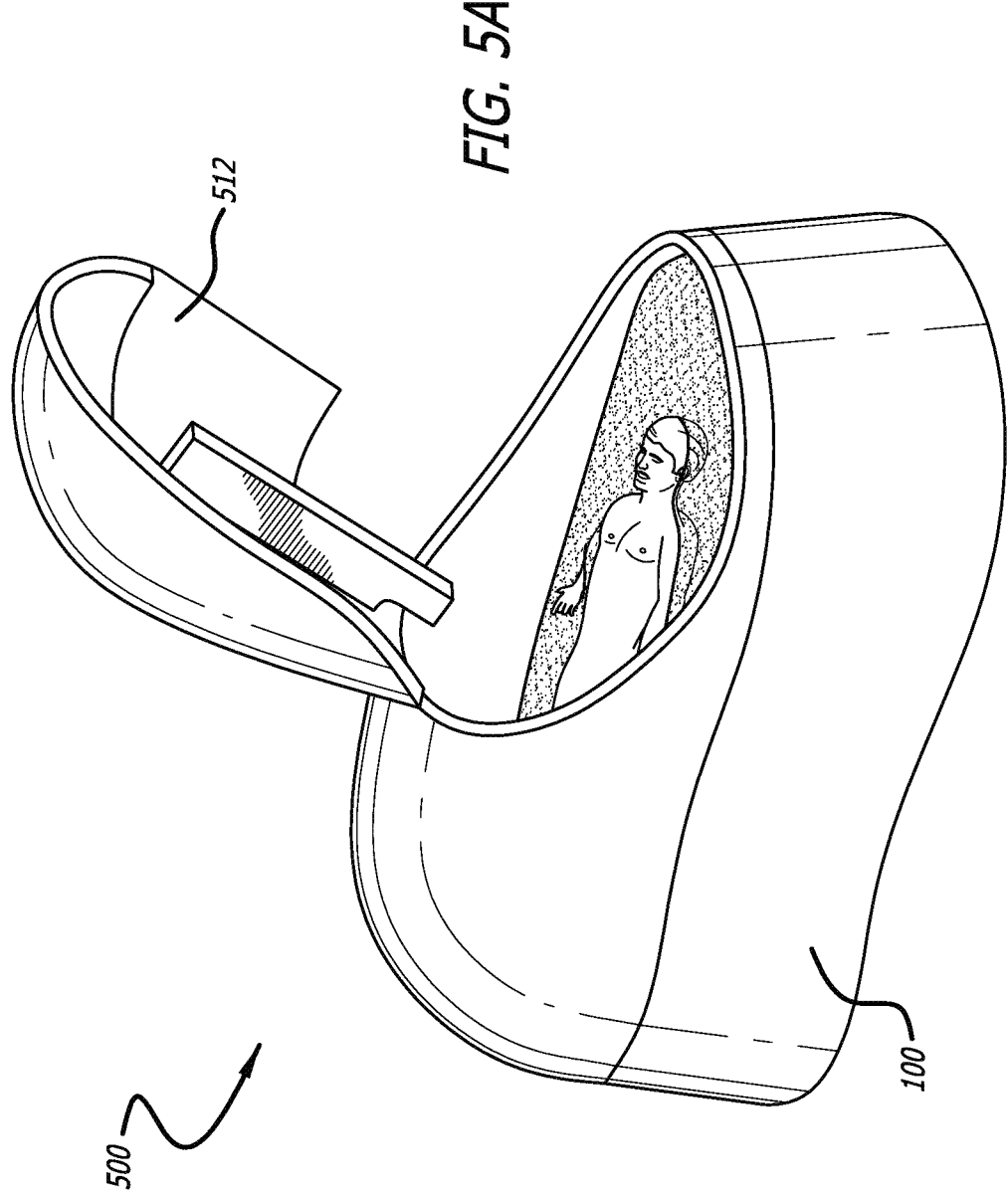

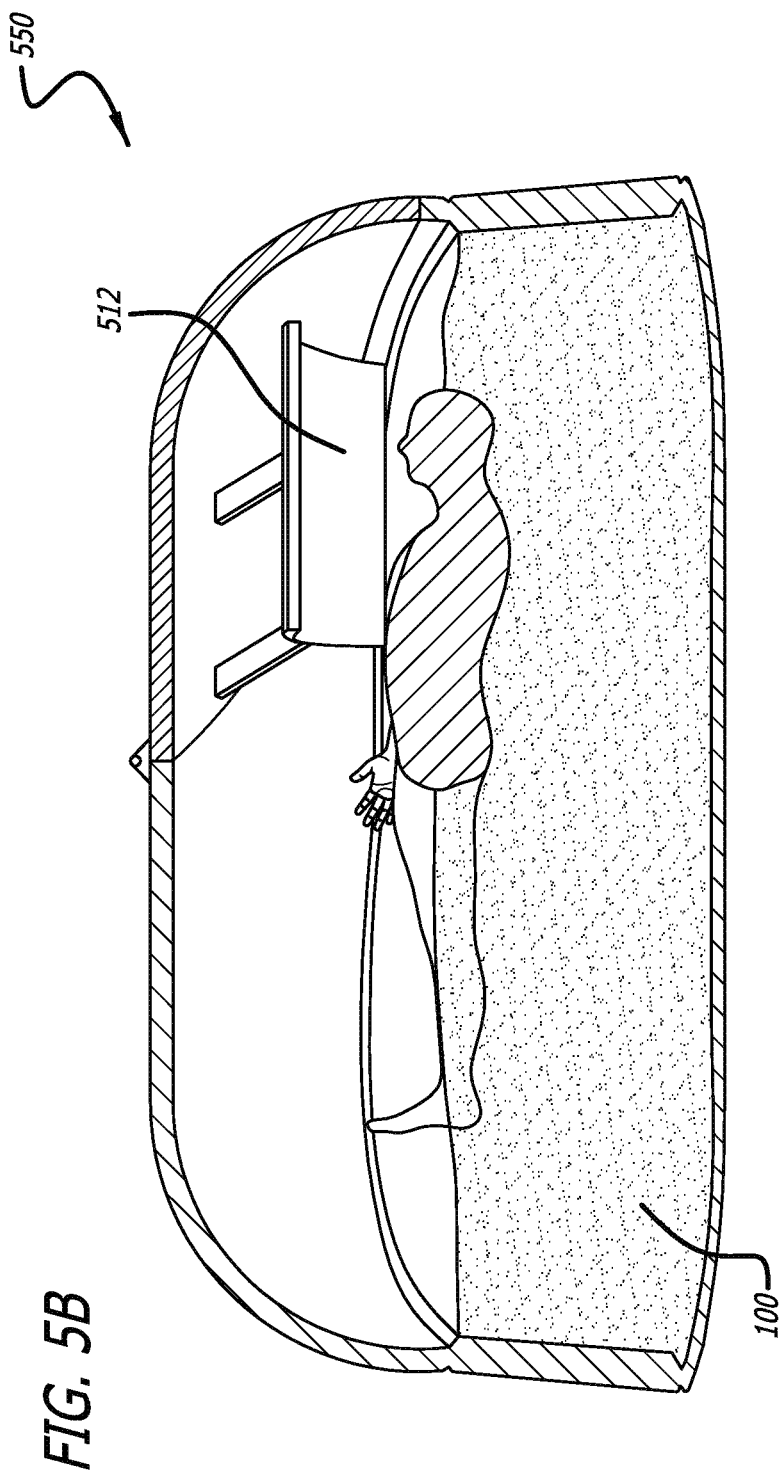

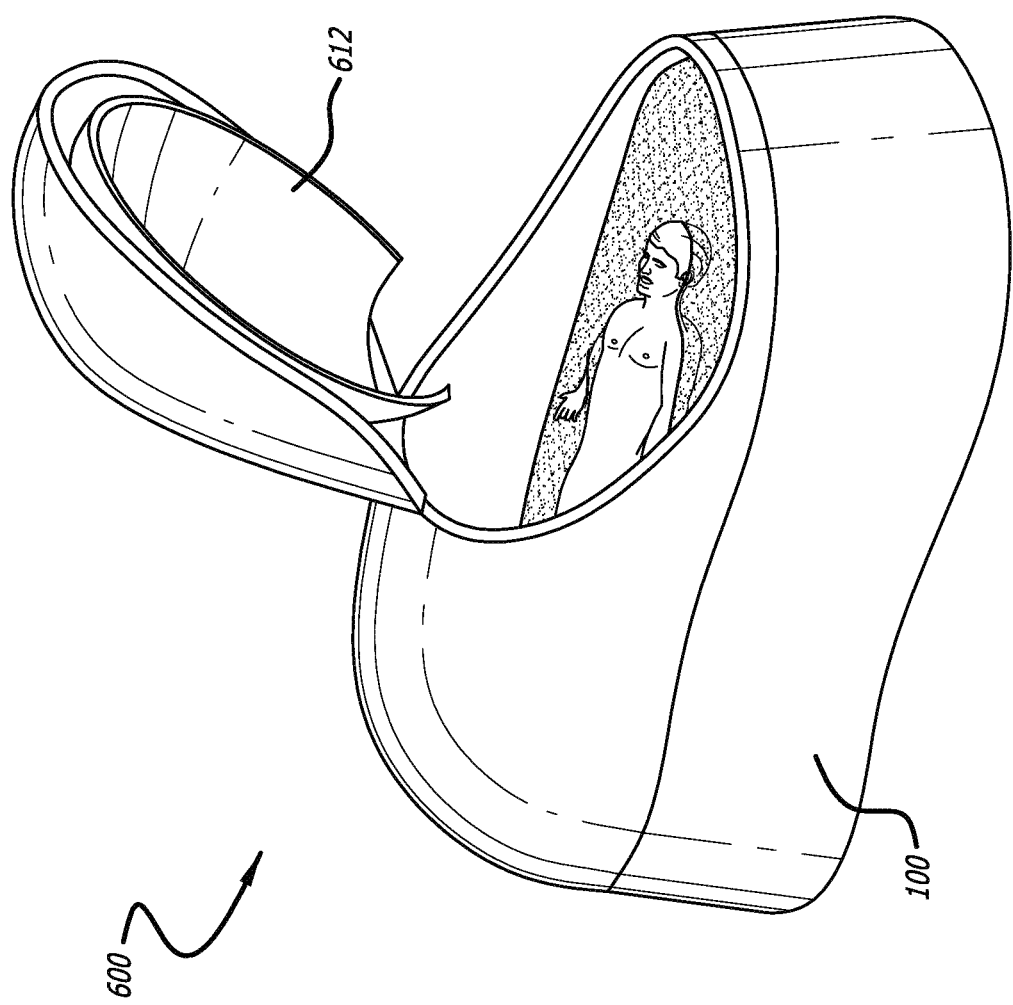

GENERATING AND PROVIDING IMMERSIVE EXPERIENCES TO USERS ISOLATED FROM EXTERNAL STIMULI

CROSS REFERENCES TO RELATED APPLICATIONS

The present application is a continuation of U.S. application Ser. No. 14/717,587, filed May 20, 2015, which is a non-provisional of U.S. provisional patent application No. 62/007,226 entitled "Generating and Providing Immersive Experiences to Users Isolated from External Stimuli" filed on Jun. 3, 2014.

The present application is also related to U.S. non-provisional patent application Ser. No. 13/829,918, entitled "Eye Piece for Augmented and Virtual Reality" filed on Mar. 14, 2013, U.S. non-provisional patent application Ser. No. 13/830,190, entitled "Tactile Elements for a Wearable Eyepiece" filed on Mar. 14, 2013, and U.S. non-provisional patent application Ser. No. 13/830,370, entitled "Visual Cortex Thought Detector Interface" filed on Mar. 14, 2013, the entireties of these applications are incorporated herein by reference.

The present disclosure relates to generating virtual reality displays and manipulating such displays by human subjects isolated from external sensory stimuli.

BACKGROUND

Isolation tanks or sensory deprivation tanks are lightless and sound proof chambers in which a person floats near the surface of very dense salt water maintained at about 34 degrees Celsius which is the normal human body temperature. The density of the water is kept high with the addition of copious amounts of Epsom salt to the water so that the person in the tank can float near the water surface with face out of the water. An isolation tank is thus configured to completely isolate a person from external stimuli such as ambient light, background noise and hot or cold sensations generally present in the atmosphere which are experienced by the person's skin. Sensory-deprivation studies of short-term and well-moderated experiences result in relaxation of the subjects similar to hypnosis or meditation.

SUMMARY

This disclosure is related to an enhancing a user's immersive experience by isolating the user from external stimuli. An immersive experience system comprising a sensory deprivation chamber is disclosed in one embodiment. The chamber comprises a base configured to accommodate a human user and a lid covering the base. The base is configured to hold a suspension liquid so that the user floats on a surface of the suspension liquid. A display screen that provides visual input to the user is attached to a portion of the inner surface of the lid that is proximate to the user's face and extends to cover the entire field of view of the user. The immersive experience system also comprises a processor and a processor readable non-transitory storage medium that comprises programming logic for execution by the processor. An audio input device is also included in the immersive experience system provides audio input to the user.

In an embodiment, the programming logic comprises input receiving logic, executed by the processor, to receive at least one input from the user and display manipulation logic, executed by the processor, to manipulate a display on the display screen based on the received input. In an embodiment, the immersive experience system further comprises a tracking module, which includes a camera configured to track the user's eyes. In an embodiment, the input receiving logic further comprises logic executed by the processor to obtain data related to the tracking of the user's eyes. In an embodiment, the display manipulation logic further comprises logic executed by the processor to manipulate the display based on the tracking data of the user's eyes. In an embodiment, the immersive experience system comprises a visual cortex thought detector configured to be attached to the user, the visual cortex thought detector detects electrical signals associated with the user's thought input. In an embodiment, the input receiving logic further comprises logic executed by the processor to obtain data related to the user's thought input. In an embodiment, the display manipulation logic further comprises logic executed by the processor to manipulate the display based on the user's thought input. In an embodiment, the programming logic further comprises content altering logic, executed by the processor, to alter an attribute of a content item shown on the display screen based on the user input.

A wearable computing system configured to be worn by the user can also be comprised in the immersive experience system in accordance with one embodiment. In an embodiment, the wearable computing system comprises a flexible frame with a plurality of tactile elements affixed thereto. The plurality of tactile elements are configured to provide tactile feedback to the user. In an embodiment, the flexible frame also comprises at least one eye piece that includes a display screen.

In an embodiment, the wearable computing system comprises at least one wearable eye piece. The wearable eye piece further comprises a flexible frame configured for shape-mating engagement with an eye socket of a human wearer such that ambient light transmission is substantially blocked between the frame and the eye socket. A display screen is fixed to an aperture in the frame such that the display shape-matingly engages with the flexible frame covers a field of view of the eye. A first processor that facilitates processing data and generating a display on the display screen and a processor readable storage medium for storing program logic are also comprised within the wearable computing system. In addition, a plurality of tactile elements responsive to said program logic arranged on the flexible frame, the tactile elements are communicatively coupled with the first processor and are selectively activatable by the first processor in response to the display on the display screen. Therefore, the tactile element control logic is included in the program logic stored on the processor readable storage medium and is executable by the first processor, for controlling the tactile elements.

In an embodiment, the flexible frame comprises an eye gasket such that the plurality of tactile elements are arranged on a rim of the eye gasket. The eye gasket facilitates the mating with the eye socket and the blockage of the ambient light. In an embodiment, the flexible frame further comprises a nose bridge member that comprises the first processor. The flexible frame can also comprise a transceiver such that the transceiver receives and sends communication signals. At least one speaker and a microphone are also arranged on the flexible frame so that the speaker generates audio signals and the microphone is operable for receiving audio input.

In an embodiment, the wearable computing system comprises two wearable eye pieces arranged side by side and configured to mate with each of two eye sockets of the human wearer.

In an embodiment, a detection module that detects movements associated with the eye socket and the eye of the wearer. In an embodiment, the detection module comprises a camera. In an embodiment, the detection module also comprises the plurality of tactile elements.

In an embodiment, the programming logic further comprises image manipulation logic, executed by the first processor, for controlling display on the display screen in response to the movements detected by the detection module. In an embodiment, the programming logic also comprises a tactile element mapping logic, executed by the first processor, for mapping each of the plurality of tactile elements to different parts of an image projected on the display screen such that activation of a part of the image activates a respective one of the tactile elements.

A method of providing content is disclosed in an embodiment. The method comprises, displaying to a user, by a processor, visual content on a display screen fixed to a flexible frame of a wearable computing device. The flexible frame is engaged in a shape mating arrangement with at least one of the user's eyes. The method further comprises, providing to the user, by the processor, tactile feedback around the user's eye, the tactile feedback is provided in synchrony with the visual content. In an embodiment, the tactile feedback is provided by activating the tactile elements attached to the flexible frame for example, by vibrating or heating at least a subset of the tactile elements.

In an embodiment, each of the tactile elements are mapped to a particular part of an avatar comprised in the visual content and providing tactile feedback in synchrony with the visual content further comprises activating specific ones of tactile elements based on experiences of the particular part of the avatar in the visual content.

In an embodiment, the method further comprises detecting, by the processor, movements of one or more of eyes and facial muscles around the eyes and executing particular tasks in response to the detected movements. In an embodiment, detecting the movements of the eyes and facial muscles further comprises collecting, by the processor, data regarding movement of one or more of the eyes and the facial muscles from a camera the particular tasks executed by the processor comprise at least manipulation, by the processor, of a display on the display screen based on the detected movements. In an embodiment, the particular tasks executed by the processor can also comprise mapping, by the processor, each of the tactile elements to a particular part of an avatar comprised in the visual content and manipulating, particular parts of an avatar comprised in the visual content in response to the detected movements.

A non-transitory computer readable storage medium, comprising processor executable instructions is disclosed in an embodiment. The storage medium comprises instructions that cause the processor to display visual content to a user on a display screen fixed to a flexible frame of a wearable computing device, the flexible frame is engaged in a shape mating arrangement with at least one of the user's eyes. The instructions also cause the processor to provide tactile feedback to the user around the user's eye, the tactile feedback is provided in synchrony with the visual content.

In an embodiment, the tactile feedback is provided by activating, by the processor, tactile elements attached to the flexible frame for example, by vibrating or heating at least a subset of the tactile elements. In an embodiment, each of the tactile elements are mapped to a particular part of an avatar comprised in the visual content and providing tactile feedback in synchrony with the visual content further comprises activating specific ones of tactile elements based on experiences of the particular part of the avatar in the visual content.

In an embodiment, the method further comprises detecting, by the processor, movements of one or more of eyes and facial muscles around the eyes and executing particular tasks in response to the detected movements. In an embodiment, detecting the movements of the eyes and facial muscles further comprises collecting, by the processor, data regarding movement of one or more of the eyes and the facial muscles from a camera the particular tasks executed by the processor comprise at least manipulation, by the processor, of a display on the display screen based on the detected movements. In an embodiment, the particular tasks executed by the processor can also comprise mapping, by the processor, each of the tactile elements to a particular part of an avatar comprised in the visual content and manipulating, particular parts of an avatar comprised in the visual content in response to the detected movements.

A system comprising at least one tactile element mounted to a flexible frame of a wearable eye piece is disclosed in an embodiment. The at least one tactile element is mounted on a perimeter of a display screen of the wearable eyepiece. The tactile element is communicatively coupled to a processor and the flexible frame is configured for a shape mating engagement with an eye socket of a human wearer such that ambient light is blocked. The tactile element comprises a base, a neck and a head, the tactile element is attached to the flexible frame at the base such that the head of the tactile element is in contact with the wearer's ski. A bi-directional actuation mechanism comprising a current-carrying coil, a pair of magnets, and a signal contact plate is comprised within the base of the tactile element. The bi-directional actuation mechanism is configured for actuating the tactile element and detecting movement of muscles in the eye socket of the wearer.

In an embodiment, the bi-directional actuation mechanism further comprises a spherical body within the signal contact plate for actuation of the tactile element. At least one of the magnets is attached to the spherical body. The spherical body and the signal contact plate are configured such that the spherical body can rotate freely along a plurality of axis within the signal contact plate. In an embodiment, the system can further comprise a plurality of speakers. A connecting wire connects the spherical body with the plurality of speakers and a gel pad is arranged such that the gel pad is in contact with the wearer and faces of the speakers are positioned in the gel pad. In an embodiment, the tactile element comprises a heating element.

In an embodiment, the at least one tactile element comprises a plurality of tactile elements. A subset of the plurality of tactile elements have surfaces in contact with the wearer's skin textured in a manner that is different from surfaces in contact with the wearer's skin of a different subset of the plurality of tactile elements. In an embodiment, the tactile element is a suction cup. In an embodiment, the tactile element is a pin hole on the flexible frame.

A method of providing content is disclosed in an embodiment. The method comprises providing a tactile element on a flexible frame of a wearable eye piece that is in shape-mating engagement with an eye socket of a human wearer such that ambient light is blocked. The method further provides for activating, by a processor, the tactile element in synchrony with video content displayed on a display screen of the wearable eye piece and detecting physical actuation of the tactile element caused by movements in muscles of the eye socket by detecting current induced in a coil comprised within the tactile element due to the physical actuation.

In an embodiment, the activation of the tactile element in synchrony with the video content further comprises vibrating, by the processor, the tactile element by inducing current through a coil comprised within the tactile element. In an embodiment, activation of the tactile element in synchrony with the video content further comprises heating, by the processor, a heating element comprised within the tactile element. In an embodiment, activation of the tactile element in synchrony with the video content further comprises generating, by the processor, suction via the tactile element that attracts the wearer's skin. In an embodiment, activation of the tactile element in synchrony with the video content further comprises providing, by the processor, audio feedback to the wearer through speakers comprised within the tactile element.

A computer readable storage medium is disclosed in an embodiment. The computer readable medium comprises instructions, which when executed by a processor cause the processor to activate a tactile element in synchrony with video content displayed on a display screen of a wearable eye piece and detect physical actuation of the tactile element caused by movements in muscles of the eye socket. The tactile element is fixed to a flexible frame of a wearable eye piece that is in shape-mating engagement with an eye socket of a human wearer such that ambient light is blocked.

A system comprising at least one wearable eye piece is disclosed in an embodiment. The eye piece comprises a flexible frame, a display screen fixed to an aperture in the frame and a visual cortex input detecting module attached to the flexible frame for detecting input from the visual cortex of the wearer. The flexible frame is configured for shape-mating engagement with an eye socket of a human wearer such that ambient light transmission is substantially blocked between the frame and the eye socket. A first processor in communication with the visual cortex input detecting module is further comprised in the system such that the first processor facilitates processing the input and generating a display on the display screen based on program logic stored on a processor readable storage medium also comprised within the system.

In an embodiment, the programming logic comprises a visual cortex display generating logic for generating a display on the display screen based on the input from the visual cortex of the wearer. The visual cortex display generating logic further comprises avatar manipulation logic for manipulating an avatar displayed on the display screen based on the input from the visual cortex of the wearer. The programming logic also comprises a visual cortex input storage logic for storing the input from the visual cortex in a computer readable storage medium and a secondary display generating logic for generating the display based on stored input obtained from a visual cortex of a second user different from the wearer.

In an embodiment, the system further comprises a plurality of tactile elements attached to the flexible frame, the tactile elements are communicatively coupled with the first processor and are selectively activated by the first processor in response to the display on the display screen. Tactile element manipulation logic, is comprised within the programming logic and executed by the first processor, for manipulating the tactile elements based on the input from the visual cortex of the wearer.

A method of providing content is disclosed in an embodiment. The method comprises various processor executable steps that include obtaining, by a first processor as electrical signals, input from a visual cortex of a first user, interpreting the electrical signals to generate a representation of the input from the visual cortex of the first user and at least one of displaying or storing visual content based on the representation to the first user on a display screen. The display screen is fixed to a flexible frame of a wearable computing device, the flexible frame is engaged in a shape mating arrangement with at least one of the first user's eye. In an embodiment, the visual content based on the representation can be stored. In an embodiment, the visual content is the representation. In an embodiment, the display comprises an avatar. In an embodiment, displaying the visual content to the first user based on the representation further comprises manipulating, by the first processor, using the input, a display shown to the first user prior to obtaining the input from the visual cortex. In an embodiment, manipulating a display further comprises changing, by the first processor, a visual attribute of an element comprised in the display based on the input from the visual cortex. In an embodiment, the visual content comprises a pattern obtained as input from the visual cortex of the first user. The method further comprises activating, by the first processor, a tactile element attached to the flexible frame based on the input from the visual cortex.

The method also comprises transmitting, by a second processor, the visual content to a second user different from the first user in accordance with one embodiment. In an embodiment, the second processor is different from the first processor. The method further comprises steps executed by the second processor. The steps comprise receiving input from a visual cortex of the second user, generating new visual content by altering the visual content based on the input from the visual cortex of the second user and storing the new visual content in a processor readable storage medium.

A computer readable storage medium, comprising processor executable instructions is disclosed in an embodiment. The instructions when executed by a processor cause the processor to obtain input from a visual cortex of a first user as electrical signals, generate a representation of the input from the visual cortex of the first user by interpreting the electrical signals and display visual content based on the representation on a display screen fixed to a flexible frame of a wearable computing device. The flexible frame is engaged in a shape mating arrangement with at least one of the first user's eye.

These and other embodiments will be apparent to those of ordinary skill in the art by reference to the following detailed description and the accompanying drawings.

BRIEF DESCRIPTION OF THE DRAWINGS

In the drawing figures, which are not to scale, and where like reference numerals indicate like elements throughout the several views:

FIG. 5A is an illustration of the immersive experience system having a display screen in accordance with one embodiment;

FIG. 5B is an illustration showing a cross-sectional view of the immersive experience system comprising the display screen in accordance with one embodiment;

FIG. 6A is an illustration of the immersive experience system having a display screen in accordance with one embodiment;

DESCRIPTION OF EMBODIMENTS

Figure 1:
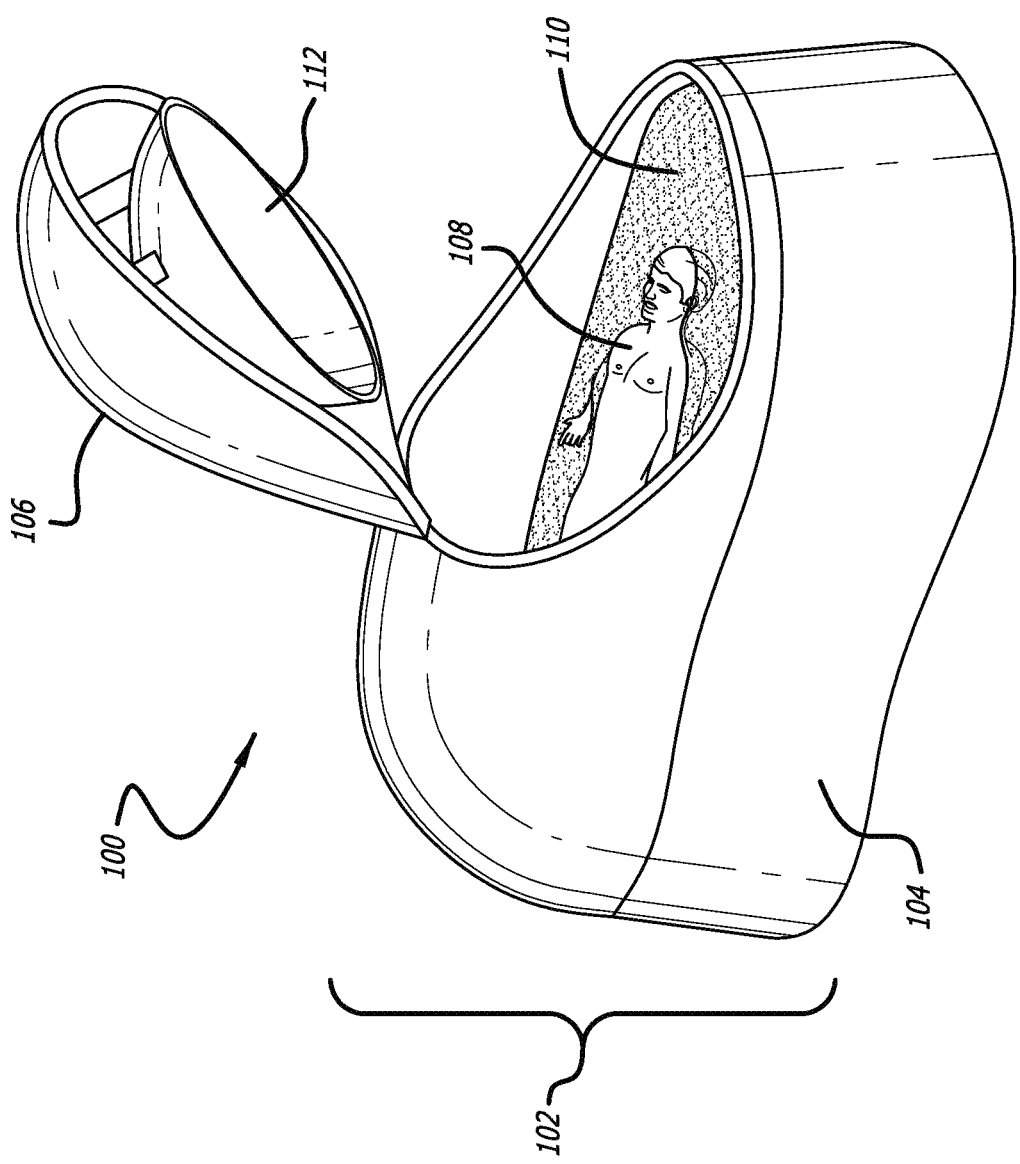
FIG. 1 is an illustration of a system to provide an immersive experience in accordance with embodiments disclosed herein.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof. The following detailed description is, therefore, not intended to be taken in a limiting sense.

In the accompanying drawings, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

The present invention is described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved. Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part. In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Virtual reality (VR) is a form of immersive multimedia experience that gained immense popularity. Computer simulation of a particular environment around a user creates an illusion to the user that he or she is immersed in a world that does not actually exist. VR systems are currently employed not only for games and entertainment, but also for training or therapeutic uses. Most virtual reality systems are combinations of hardware configured with software to create primarily visual experiences with high definition, 3D graphics. Certain VR systems further enhance such visual experiences with the addition of other stimuli such as appropriate audio and/or tactile information. VR systems generally comprise besides general-purpose and/or specialized processors, I/O hardware such as high definition display screens, audio components like speakers/headphones and microphone, keyboards, mouse, gamepads, joysticks and the like. Software can include various device drivers that operate at the kernel level to drive the audio, video or other I/O subsystems, middleware and the game or other software with user-interfaces that enable the users to interact with the hardware.

Immersion is generally classified into different categories such as tactical immersion or sensory-motoric immersion experienced during games where players execute certain actions involving physical dexterity/skill that result in success, strategic immersion or cognitive immersion associated with mental challenge and narrative immersion or emotional immersion such as when a user becomes involved in the story. Another form of immersion is spatial immersion wherein a user is immersed in a virtual world that feels 'real' to the user and the user experiences the sense of actually being 'there'. This can be achieved with systems such as, Computer Assisted Virtual Environments (CAVE) wherein a person enclosed in a small cube-like room is immersed in a virtual environment by projecting images onto the walls of the room with projectors located at different points in the room.

Embodiments are disclosed that further enhance users' immersive experiences. This is achieved by initially isolating the users from as many external stimuli as possible and then filling up the void thus created with stimuli provided by the systems described herein. As the user is isolated from external stimuli including light, sound and touch, the user's level of immersion in the experience provided by the systems disclosed herein is enhanced. In an embodiment, the user is immersed in a chamber known as isolation tank or sensory deprivation tank. Isolation tanks or sensory deprivation tanks are used for relaxation, meditation, alternative medicine and for research into the workings of the human mind. They are designed to completely isolate a person from external stimuli that are normally received by the person's sense organs. As the sensory deprivation tank is completely dark and sound proof, the person is isolated from light and sound stimuli. Moreover, the person in a sensory deprivation tank floats in high-density liquid maintained at around normal human body temperature. This lack of temperature differential between the person's body and the surroundings results in the person losing the sense of being as the person will not be able to feel the edge of his/her body and the surroundings. Such isolation allows the person to relax and provides an optimal environment for the person to be immersed in different experiences without external disturbances.

Turning now to the figures, FIG. 1 is an illustration of a system 100 that provides an immersive experience in accordance with embodiments disclosed herein. The immersive experience system 100 comprises a sensory-deprivation or isolation chamber 102. The chamber 102 comprises a shallow, recessed base 104 with a depth of about 12 inches to 24 inches. The base 104 is configured as a tank to hold the suspension liquid 110 which has a relative density of about 1.25 and is maintained at normal human body temperature of about 34 degree Celsius or 95 degrees Fahrenheit. In an embodiment, the suspension liquid can comprise salt water. A large amount of salt is added to the water 110 in order to increase its density. This facilitates a person 108 to float on the surface of the water 110 with face out of the water. Although the suspension liquid comprises water in accordance with one embodiment, it may be appreciated that other suspension liquids currently know or to be invented can also be used in accordance with embodiments of the disclosed subject matter.

The chamber 102 is made light and sound proof by a hatch 106. Not only does the hatch 106 keep out light and sound, but it also serves to maintain the temperature of the suspension liquid 110 at normal body temperature so that the person 108 will no longer be able to differentiate the transition from his/her body to the surrounding environment which comprise the suspension liquid 110 and the air trapped within the chamber 102 by the enclosed hatch 106. In an embodiment, the chamber 102 can be fitted with a temperature control mechanism (not shown) in order to maintain a constant temperature of 34 degree Celsius for the suspension liquid 110 and the air within the chamber 102. Thus, when the person 108 lies in the suspension liquid 110 with the hatch 106 closed, the person 108 will begin to experience an isolated state in which his/her body will be devoid of external stimuli such as but not limited to ambient light, background noise and the tactile sensations from the surroundings.

In an embodiment, the chamber 102 is further provisioned with the various elements of a virtual reality system as will be detailed further infra. One element of the VR system incorporated into the chamber is the curved, OLED (Organic Light Emitting Diode) display screen 112 attached to the inner surface of the hatch 106. As an OLED display works without backlight, it can be thinner and lighter than liquid crystal display (LCD) and a higher contrast ratio can be achieved in low ambient light conditions. The human eyes have almost 180-degree forward-facing horizontal field of view. With eyeball rotation of about 90 degrees (excluding head rotation), the horizontal field of view extends to almost 270 degrees. Therefore, the display screen 112 is curved in order to accommodate the entire field of view of the user 108. In an embodiment, the display screen 112 extends from about 1-2 sq. meters around the user's 108 face and head region in order to keep the user 108 focused on the display generated on the display screen 112 and to prevent distracting the user 108 from his/her immersive state. Although a circular display screen is shown in FIG. 1, it may be appreciated that this is not necessary and that the display screen 112 may take other shapes as will be described further infra.

Traditional immersive VR systems require users to move their bodies to manipulate input equipment such as a keyboard or mouse etc., thereby detracting them from achieving true immersion. In an embodiment, the immersive experience of the user 108 can be further enhanced by receiving user commands or feedback without requiring the user 108 to move his/her body. The user 108 can therefore maintain his/her immersive state undisturbed. This is achieved via a user eye-tracking element (not shown) that enables the immersive experience system 100 to track the user's 108 eyes and execute particular commands based on the location and time of resting of the user's 108 gaze. This provides one modality for the user 108 to interact with the content being shown in the display screen 112. In an embodiment, the display screen 112 can be further configured with a tracking element which can include one or more cameras (not shown) arranged on the periphery of the display screen 112. The cameras can be focused on the user's 108 face and more particularly, the user's 108 eyes. For example, the user 108 can be instructed to place his head at a particular position within the suspension liquid 110. This facilitates the cameras to identify the user's 108 eyes for tracking purposes. In an embodiment, images from the multiple cameras can be coordinated to locate the position on the display screen 112 at which the user's gaze rests.

The immersive experience system 100 can be employed for displaying and interacting with various types of data such as text, images or video associated with web pages or other content such as movies or video games. In an embodiment, the content can be accessed from a local processor readable storage medium associated with the immersive experience system 100. In an embodiment, the content can be streamed to the immersive experience system 100 via networks such as the Internet. Accordingly, the immersive experience system 100 includes hardware such as one or more general purpose processors, specialized processors to run graphics and other components that are normally included in computing devices that execute games or other interactive software. In an embodiment, the hardware (not shown) can be included in the base 104 of the chamber 102. In an embodiment, the hardware (not shown) can be included in the hatch 106 of the chamber. In an embodiment, the immersive experience system 100 further comprises audio elements such as speakers and a microphone. This enables providing audio to and receiving audio feedback from the user 108.

Figure 2:
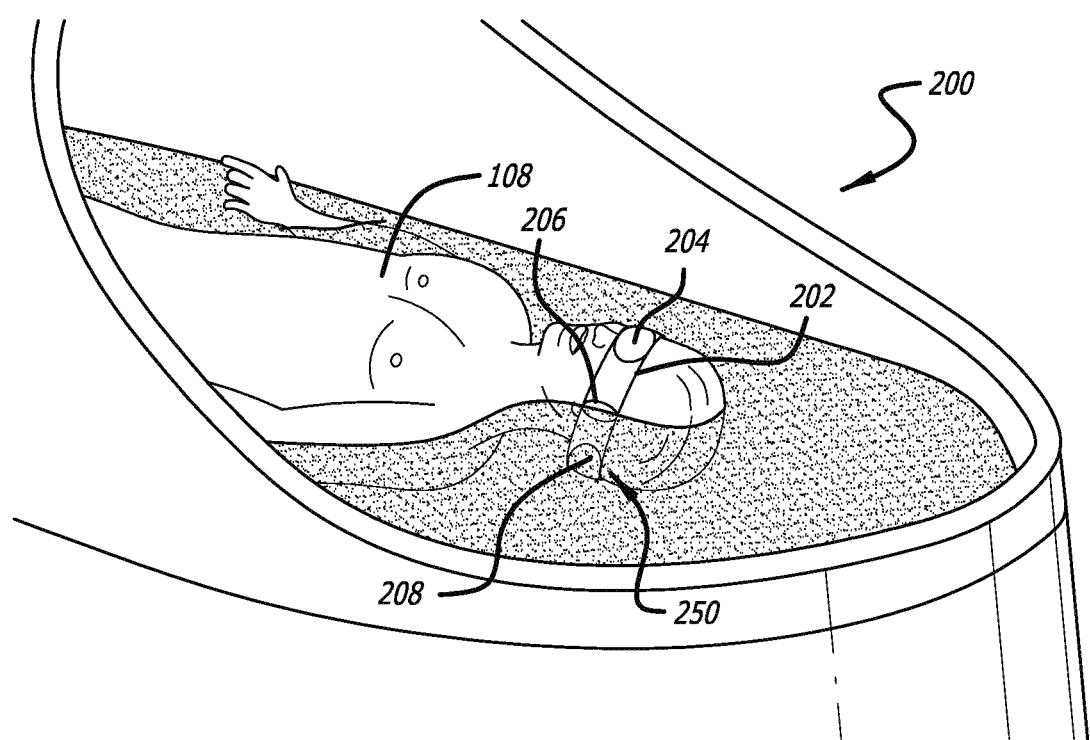
FIG. 2 is an illustration of the user in the immersive experience system in accordance with one embodiment.

In an embodiment, the immersive experience system 100 is designed not only to provide passive audio-video experiences but can be further configured to provide tactile feedback in consonance with the audio-video experiences. FIG. 2 is an illustration 200 of the user 108 in the immersive experience system 100 receiving tactile input in accordance with one embodiment. The immersive system 100 is further configured to provide tactile input to the user via a wearable computing system 250. In an embodiment, the wearable computing system 250 is configured to operate synchronously with the immersive experience system 100 to provide the tactile input.

In one embodiment, the wearable computing system 250 comprises a flexible frame 202 made of elastic material worn in a form-fitting arrangement over the user's eyes. It may be appreciated that the frame 202 serves a dual purpose of bearing additional components of the immersive experience system 100 and protecting the user's 108 eyes and ears from the suspension liquid 110. The flexible frame 202 comprises a plurality of tactile elements (not shown) thereon in accordance with an embodiment. Thus, the user's 108 eye sockets are surrounded by a flexible frame 202 with tactile elements attached thereto that provide the tactile feedback as will be detailed further infra. In an embodiment, the frame can comprise one or more eye pieces 204, each with its own display screen which will be configured to work in correspondence with the display screen 112 to enhance the user's 108 immersive experience. Moreover, the frame worn by the user 108 can include eye tracking elements such as, cameras, thereby mitigating the need for using the tracking elements included in the display screen 112. In an embodiment, the flexible frame 202 further includes audio components such as noise-cancelling headphones 206 which provide sound input to the user 108. The headphones 206 can be located at a portion of the flexible frame 202 that covers the user's 108 ears.

In an embodiment, the immersive experience system 100 further comprises a visual cortex thought detector 208 that detects thoughts of the user 108 and changes the display on the screen 112 and/or screens of eyepieces on the flexible frame 202 based on such recorded thoughts. Again, it may be appreciated that although the visual cortex thought detector 208 is shown as being comprised in the wearable computing device 250, this is not necessary. The visual cortex thought detector 208 can be separately attached to the user's 108 head without including the other portions of the wearable computing system 250 in accordance with one embodiment. In this case, the visual cortex thought detector 208 can be communicatively coupled to the processor (not shown) of the immersive experience system 100 located in the isolation chamber 102. In an embodiment, the visual cortex thought detector 208 can be configured to record the electrical activity of the user's 108 brain via leads that contact the rear portion of the user's 108 head where the virtual cortex of the brain is situated. Technologies such as EEG (electroencephalograph), are known which provide ways of non-invasively observing human brain activity. For example, technologies such as Emotiv EPOC provided with headsets and related computer interfaces from Emotiv Lifescience can be adapted for use with the immersive experience system 100 to record thoughts and manipulate content as will be detailed further herein.

As discussed supra, the immersive experiences provided to the user 108 by the immersive experience system 100 can comprise content items such as movies, video games, training material and the like along with respective audio and/or tactile input data. It can be appreciated that the wearable computing system 250 can work synchronously with the immersive experience system 100 to provide content, receive user feedback and manipulate the content based on the user's feedback. It may be appreciated that the different components, eyepiece(s) 202, headphones 206 and/or the thought detector 208 can be selectively employed to execute different tasks. For example, the video data of a piece of content can be shown to the user 108 on one or more of the display screen 112 and/or the display screens of the eye piece(s) 204 associated with the wearable computing system 250. When presenting the data on the display screen 112, the screens associated with the eye pieces 204 can be made transparent by passing electric charge. Similarly, the associated audio can be provided to the user 108 via one or more of the ear phone 206 or speakers associated with the immersive experience system 100. In an embodiment, the tactile elements associated with the flexible frame 202 can only be employed to provide the tactile feedback to the user 108 while displaying the video content on the display screen 112. As mentioned supra, the thought detector 208 can also be separately actuated by the immersive experience system 100 to receive thought input from the user 108 in accordance with embodiments described herein.

In an embodiment, the eye piece(s) 204, headphones 206 and the visual cortex thought detector 208 are shown in FIG. 2 as integrated apparatus that works together. In an embodiment, the band 202 can include only a subset of the elements such as the eye pieces 206, headphones 208 or the thought detector 208 shown in FIG. 2. In this case, the functionality associated with the missing elements can be provided by other modules of the immersive experience system 100 as will be detailed further infra. For example, if the band 202 bears only the tactile elements (not shown) and the visual cortex thought detector 208, the functionality associated with the eye pieces 202 and headphones 206 can be provided by the display screen 112 and other audio components of the immersive experience system 100. Thus, the wearable computing system 250 provides for greater flexibility when using the immersive experience system 100.

Figure 3:
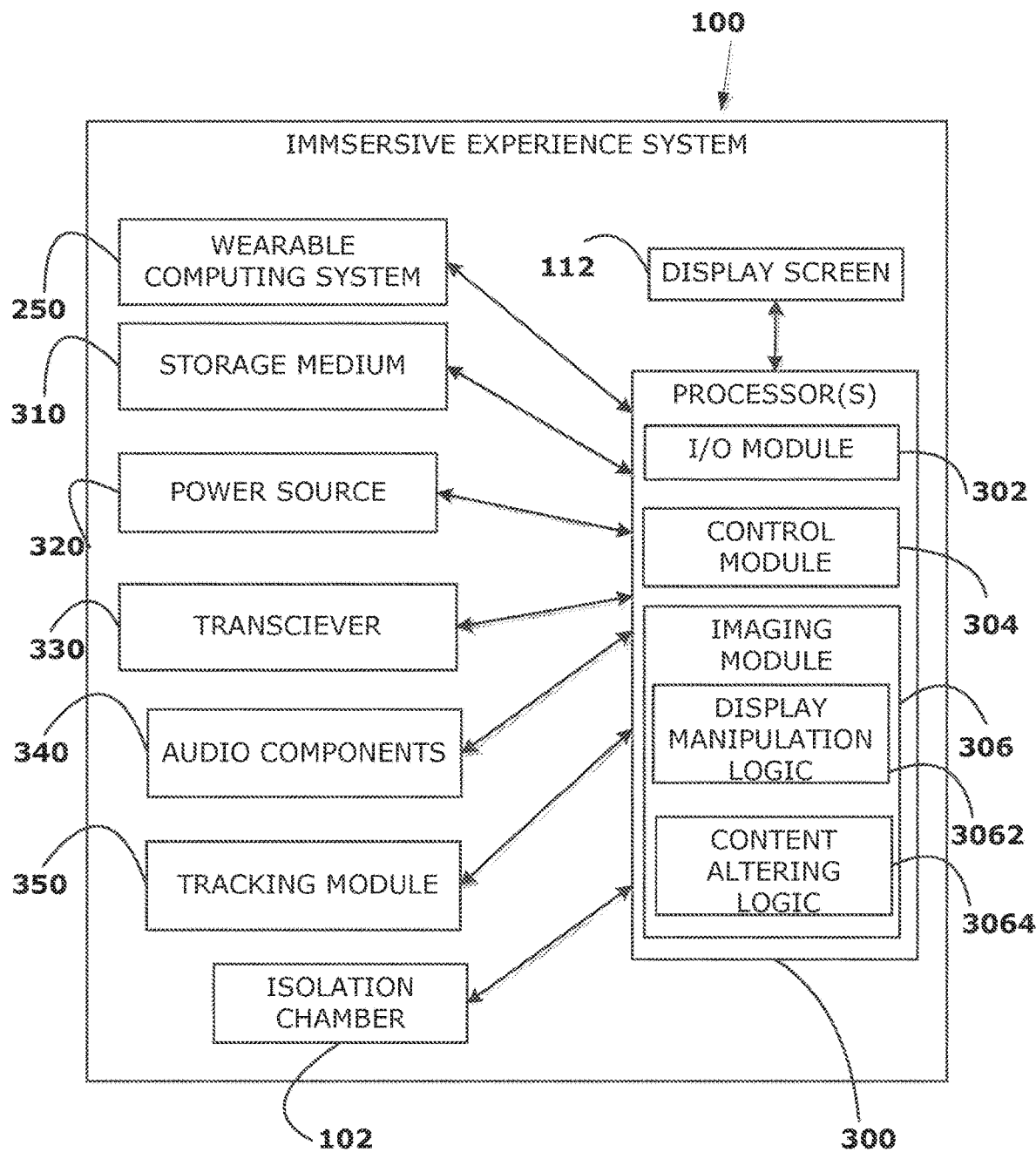
FIG. 3 shows a schematic diagram of the various modules comprised in the immersive experience system in accordance with one embodiment.

FIG. 3 shows a schematic diagram of the various modules comprised in the immersive experience system 100 in accordance with one embodiment. In addition to the display screen 112 and the isolation chamber 102, the immersive experience system 100 comprises one or more processors 300, a processor readable storage medium 310, a power source 320, a transceiver 330 audio components 340 which can include speakers and a microphone and a tracking module 350 comprising for example, one or more cameras used to track user's eye movements and gestures and the wearable computing system 250. The following presents details of the main modules of the immersive experience system 100 co-located with the chamber 102 other than those comprised in the wearable computing system 250. The wearable computing system 250 and its components will be detailed in other diagrams infra. The various modules of the immersive experience system 100, with the exception of the wearable computing system 250, can be communicatively coupled via interfaces such as a computer bus (not shown) in order to exchange data/communications. The wearable computing system 250 preferably exchanges data/communication with other modules of the immersive system 100 via other modalities such as, for example, wireless transceivers as detailed herein.

In an embodiment, the immersive experience system 100 can comprise one or more general purpose processors 300 to control and coordinate the various other modules to provide a safe, relaxing immersive experience to the user 108. In addition, the immersive experience system 100 can also comprise specialized processors such as graphics processors to execute processing-intensive tasks such as rendering and manipulation of 3D images on the display screen 112. In an embodiment, the processor 300 comprises an I/O module 302 to receive input from and provide output to the various other modules in the immersive experience system 100. The I/O module 302 comprised within the processor 300 can be configured to receive different types of inputs from various components such as user gesture or eye movement input from the tracking module 350, user thought input from visual cortex thought detector 208 or audio inputs from audio components 340 such as a microphone. The processor 300 can also receive inputs such as, the content to be displayed on the display screen 112 from the local storage medium 310 or from a remote server (not shown) via the transceiver 330.

In an embodiment, the transceiver 330 can enable the processor 300 for communicating with distant components such as a remote content provider or for communicating with closer entities such as the wearable computing system 250. Thus, the processor 300 is enabled for wired or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like.

The various inputs thus received from different modules are processed by the appropriate programming or processing logic within the control module 304 of the processor 300 which provides responsive output as will be detailed further infra. The programming logic can be stored in a memory unit that is on board the processor 300 or the programming logic can be stored in an external processor readable storage device/medium 310 and can be loaded by the processor 300 as required. In an embodiment, the processor 300 can execute programming logic to display content streamed by the remote server on the display screen 112 in addition to tactile element control logic to activate relevant ones of the tactile elements (not shown) in an appropriate manner and provide tactile feedback to the user in synch with the displayed content. The commands related to the activation of the tactile elements can be provided with the content from the remote server and the tactile element control logic stored on the storage medium 310 and executed by the processor 300 can interpret the commands to activate the tactile elements appropriately. In addition to controlling the content on the display screen 112, the control module 304 can also be configured to control other components of the immersive system 100 such as sensing the density of the suspension liquid 110, or maintaining the temperature of the suspension liquid 110.

In an embodiment, an imaging module 306 is also comprised within the processor 300. In an embodiment, the imaging module 306 can include programming logic display creation/manipulation logic 3062 executed by the processor 300 in order to create or manipulate a display based on the input obtained from one or more of the tracking module 350 and the visual cortex thought detector 208. The input received by the processor 300 from the tracking module 350 relates to eye tracking and movements of muscles around the eyes of the user 108. Based on the direction of motion of the eye balls or direction and force of the movements of muscles around the eyes (which can be sensed by the tactile elements as will be detailed infra), the display manipulation logic 3062 comprised in the imaging module 306 can execute various tasks that would normally be executed by a mouse or a joystick or other user input mechanism. Thus, the user 108 can execute tasks associated with a computing device such as generating text or image data by moving his/her eyes or muscles around the eyes.

In a further embodiment, the imaging module 306 can comprise content altering logic 3064 that is executed by the processor 300 to change an existing display, generate new elements in a display based on input received from the visual cortex thought detector 208. For example, the user 108 can imagine a geometric pattern with a particular color with his/her eyes closed. While the tracking module 350 may not be able to provide user input to the processor 300 with the user's eyes closed and no muscle movements. However, the visual cortex thought detector 208 can obtain information regarding the user's 108 imagination and the imaging module 306 can execute the display manipulation logic 3062 to show the user's imagination on the display screen 112. In an embodiment, the input from the visual cortex thought detector 208 can be transmitted by the transceiver 330 to a remote server (not shown) where such input is interpreted and a display based on such input is created and transmitted back to the immersive experience system 100. In this case, the display manipulation logic 3062 is merely employed to show such received display to the user 108 on the display screen 112. In an embodiment, the I/O module 302 can be further configured to store such user experiences/imaginations that are obtained by the visual cortex detector 208 on a local storage device 310 or a remote server (not shown).

In an embodiment, the immersive experience system 100 can additionally facilitate storing user experiences, recreating the user experiences and exchanging user experiences according to one embodiment. A user experience generally comprises a content item such as a movie, a video game, a documentary or training video and the like with its associated audio and tactile data. In the programming paradigm, the content item or elements thereof can be configured as objects and the different input mechanisms such as the audio input or tactile inputs to the user 108 can be associated properties or attributes of respective objects. In an embodiment, the input mechanisms/attributes can also be objects with various properties defined, for example, in terms of name-value pairs and associated functions that include programming logic to execute particular actions and/or activate particular piece of hardware of the immersive experience system 100 at specific time points during the play of the content item.

In an embodiment, the input mechanisms can be programmed to comprise different values wherein setting a particular value for an object attribute will result in specific kind of feedback. This allows the user 108 to consume an item of content via the immersive experience system 100, interact with the content item and change the content item to create a new content item. The new content item generated by the user 108 can be stored in one or more of a local storage device or a processor readable storage on the LAN or a remote processor readable storage on the 'cloud' which can constitute one or more servers located remotely from the user 108 and which stream content to the immersive experience system 100. Such new content items or user experiences created by the user 108 can be shared with other users. For example, a video game consumed by the user 108 can have certain tactile feedback associated with certain objects. In an embodiment, the user 102 can change the video game to layer an additional tactile feedback, for example, by altering existing attribute values or defining new attributes/values as permitted by the content item. The video game with the altered tactile feedback information can be stored as a user experience either locally or remotely which may further be shared with other users. In an embodiment, the stored/shared user experience can comprise additional content that is obtained from external sources. For example, images or voice over obtained from other content can be added to a particular content item. In an embodiment, the new content added to a user experience can be obtained from the user's 108 thoughts by the thought detector 208. In an embodiment, the content can comprise an avatar that the user 108 can interact with via eye gestures or via commands provided to the visual cortex detector 208 as will be detailed further infra.

Figure 4:
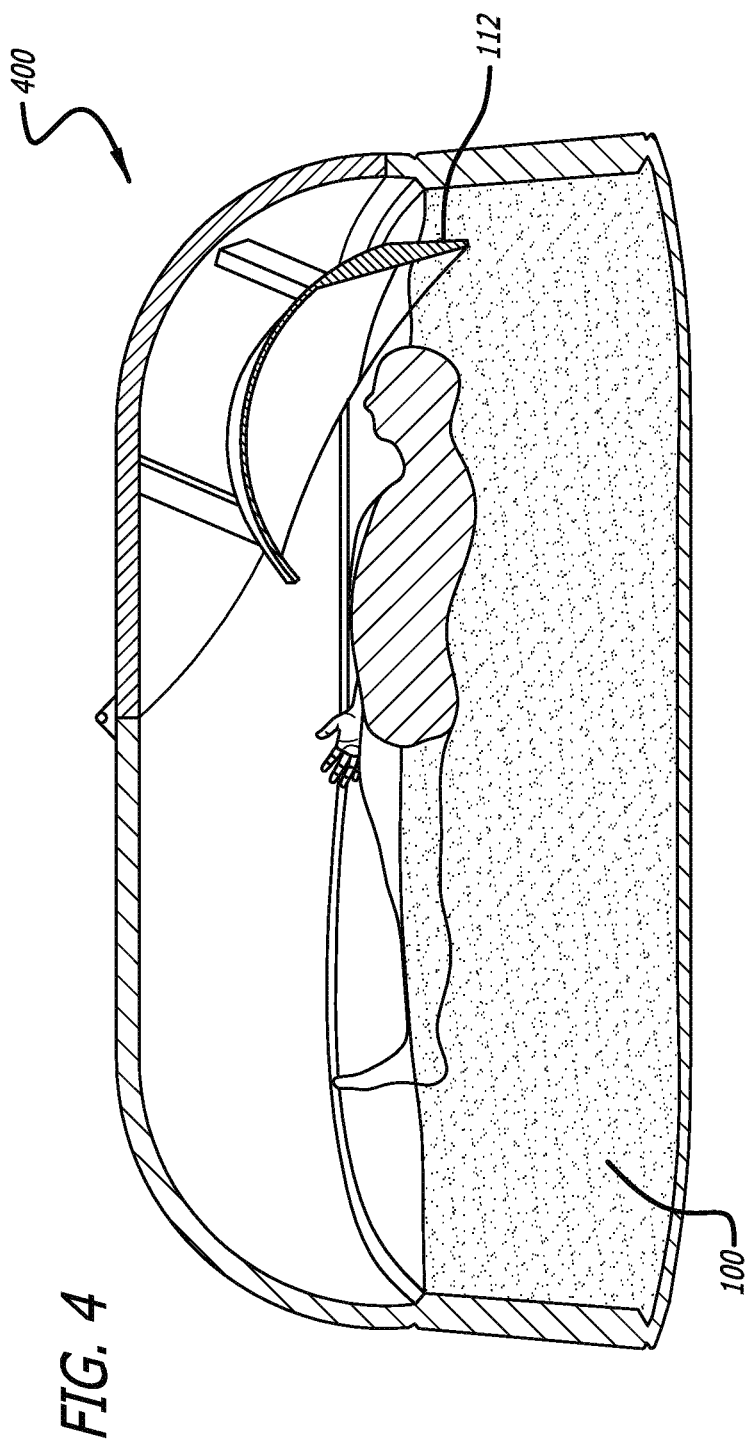
FIG. 4 is an illustration showing a cross-sectional view of the immersive experience system in accordance with one embodiment.

FIG. 4 is an illustration 400 showing a cross-section of a view of the immersive experience system 100 comprising the curved display screen 112 in accordance with one embodiment.

FIG. 5A is an illustration 500 of the immersive experience system 100 having a display screen 512 in accordance with one embodiment. It may be noted that the display screen 512 has a curved rectangular shape as opposed to the disc shape of the display screen 112.

FIG. 5B is an illustration 550 showing a cross-section of a view of the immersive experience system 100 comprising the display screen 512 in accordance with one embodiment.

FIG. 6A is an illustration 600 of the immersive experience system 100 having a display screen 612 in accordance with one embodiment. It may be noted that the display screen 612 has an elongated elliptical shape when compared the disc shape of the display screen 112 or the curved rectangular shape of the display screen 512.

Figure 6B:
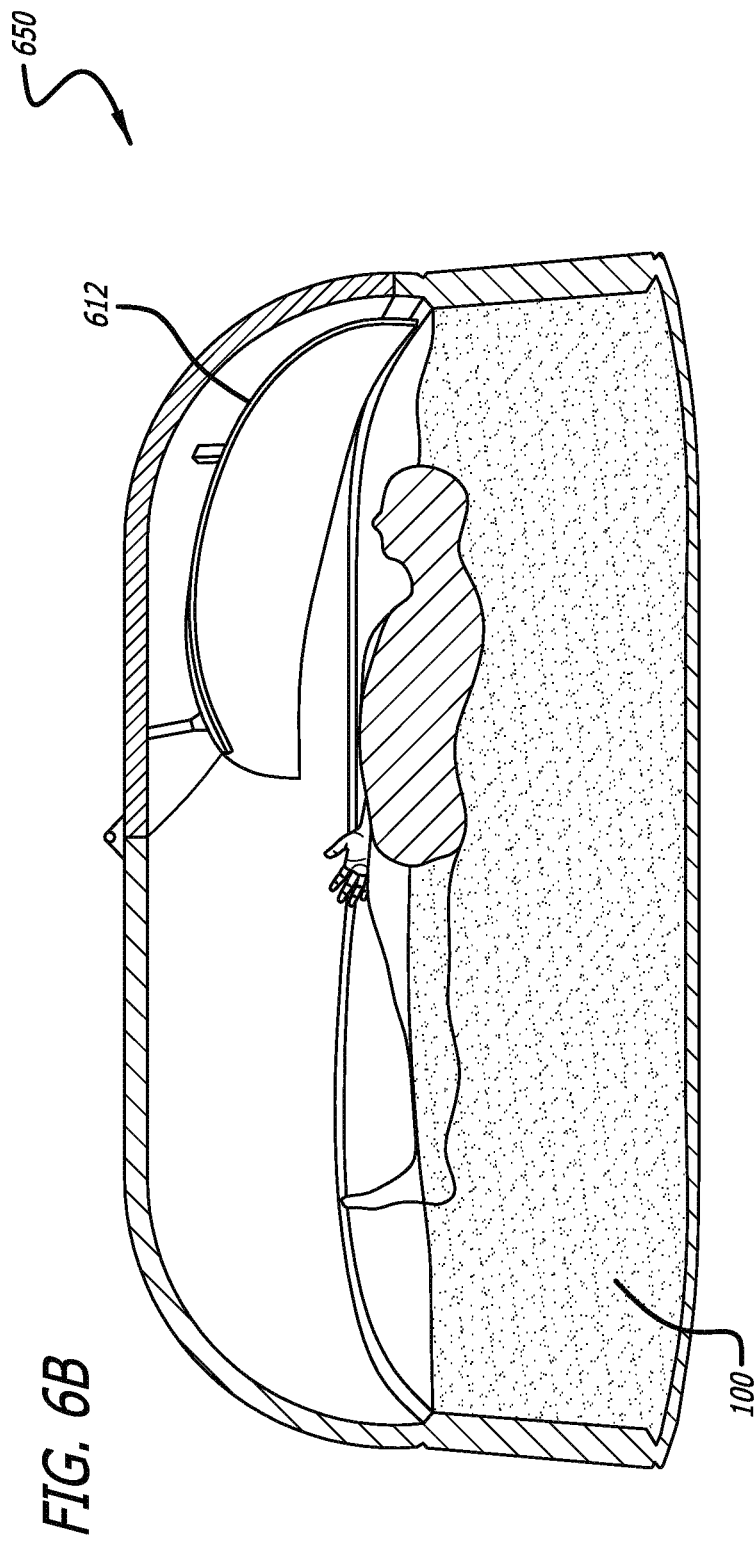
FIG. 6B is an illustration showing a cross-sectional view of the immersive experience system comprising the display screen in accordance with one embodiment.

FIG. 6B is an illustration 650 showing a cross-section of a view of the immersive experience system 100 comprising the display screen 612 in accordance with one embodiment.

It may be appreciated that FIGS. 1, 2, 5A and 6A show the chamber 102 with its hatch 106 open only to illustrate the shape of the display screens and location of the user 108 in the chamber 102 relative to the display screen. However, when providing an immersive experience to the user 108, the hatch 106 is closed as shown in FIGS. 4, 5B and 6B.

Wearable Computing System

The following describes the wearable computing system 250 used in accordance with embodiments described herein. Certain modules may be duplicated between the hardware of the immersive system 100 co-located within the chamber 102 and the wearable computing system 250. For example, components such as the display screen(s), audio elements, processors and the like are included both in the main hardware co-located with the chamber 102 and the wearable computing system 250. In this case, it may be appreciated that the control module 306 of the processor(s) 300 can selectively activate one or more modules either from the wearable computing system 250 and/or the main modules co-located with the chamber 102. By the way of illustration, such selective activation can be based on the instructions associated with the content included in the immersive experience being provided to the user 108. For example, the display screen 112 can be employed to provide video of an immersive experience content to the user 108 while the tactile elements and headphones 206 of the wearable computing system 250 can be employed to provide the tactile feedback and audio input to the user 108.

Figure 7:
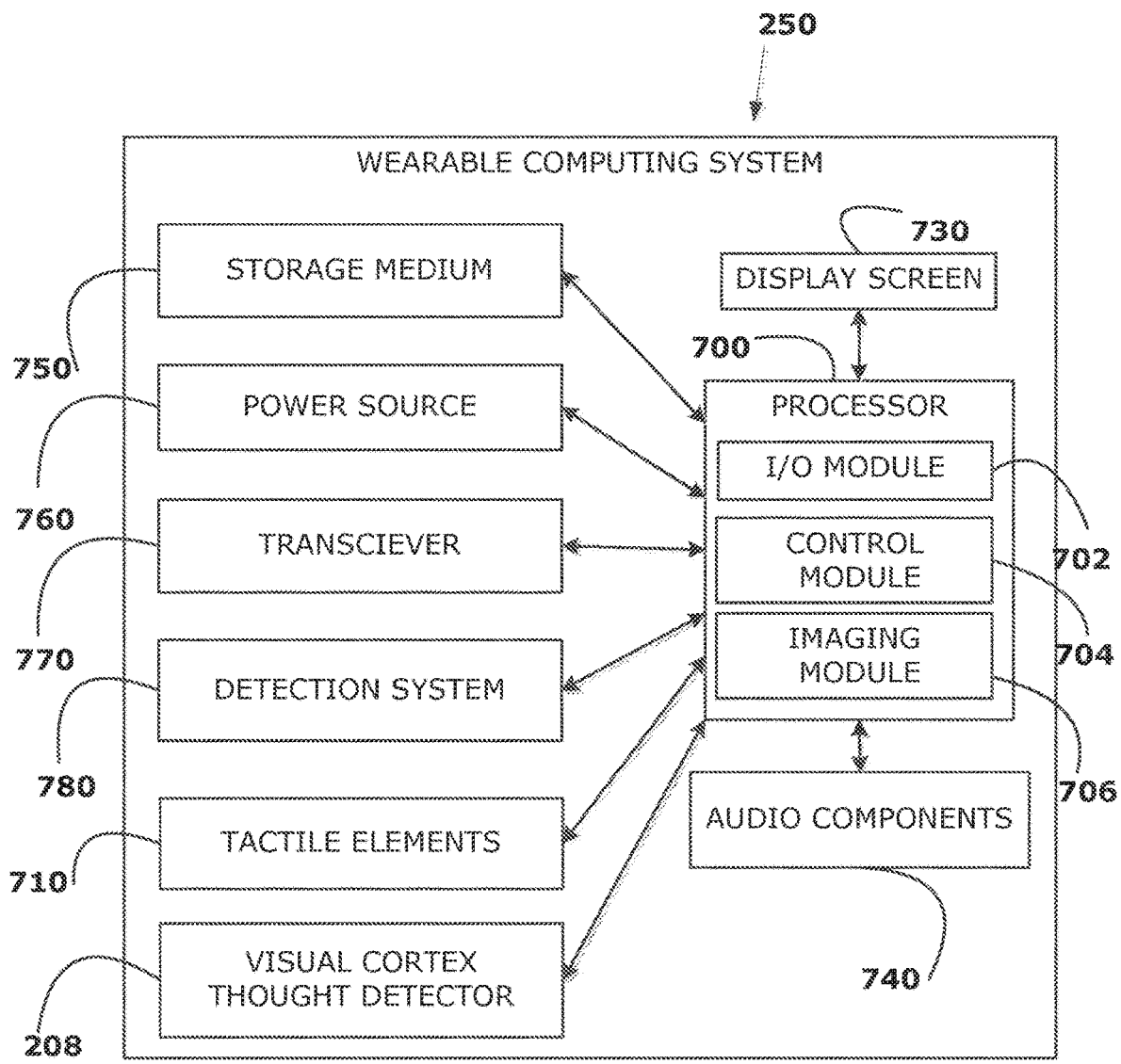
FIG. 7 is a block diagram depicting certain example modules within the wearable computing device in accordance with embodiments of the present disclosure.

FIG. 7 is a block diagram depicting certain example modules within the wearable computing system 250 in accordance with an embodiment. It can be appreciated that certain embodiments of the wearable computing system/system 250 can include more or less modules than those shown in FIG. 7. The wearable computing system 250 comprises a processor 700, tactile elements 710, display screen 730, a visual cortex thought detector 208, audio components 740, storage medium 750, power source 760, transceiver 770 and a detection module/system 780. FIG. 7 shows modules generally comprised by one eye piece of the wearable computing system 250. However, it may be appreciated that the wearable computing system 250 can include two eye pieces which may each have all the modules disclosed herein or the eye pieces can be configured to be used together and can include one of the aforementioned modules in addition to two display screens in order to avoid duplication of modules in the wearable computing system 250.

The wearable computing system 250 can be configured to include the processor 700 at an appropriate location, for example, at the bridging portion connecting the two eyepieces. The processor 700 further comprises by the way of illustration, an input/output (I/O) module 702, a control module 704 and an imaging module 706. Again, it can be appreciated that although only one processor 700 is shown, the wearable computing system 250 can include multiple processors or the processor 700 can include task-specific sub-processors. For example, the processor 700 can include a general purpose sub-processor for controlling the hardware comprised within the wearable computing system 250 and a dedicated graphics processor for generating and manipulating the displays on the display screen 730. The I/O module 702 comprised within the processor 700 can be configured to receive different types of inputs from various components. In an embodiment, the I/O module 702 receives input from external sources such as the processor(s) 300 co-located with the chamber 102 or provides output to such external elements as will be detained herein. In an embodiment, the I/O module 702 also receives input such as user gesture input from the detection system 780, user thought input from visual cortex thought detector 208, or audio inputs from audio components 740 such as a microphone. In an embodiment, the microphone may be included in the wearable computing system 250 or the main hardware co-located with the chamber 102. The processor 700 can also receive inputs related to the content to be displayed on the display screen from local storage medium 750 or from a remote server (not shown) or from other modules of the immersive system 100 co-located with the chamber 102 via the transceiver 770. The processor 700 can additionally receive input from the tactile elements 710 regarding movements of the user's muscles which are monitored by the tactile elements 710 as part of the detection system 780. The processor 700 is also configured to provide appropriate outputs to different modules of the wearable computing system 250 and other networked resources such as the remote server (not shown) or modules of the immersive system 100 co-located with the chamber 102.

The various inputs thus received from different modules are processed by the appropriate programming or processing logic within the control module 704 of the processor 700 which provides responsive output as will be detailed further infra. The programming logic can be stored in a memory unit that is on board the processor 700 or the programming logic can be stored in an external processor readable storage device/medium 750 and can be loaded by the processor 700 as required. In an embodiment, the processor 700 can execute programming logic to display content streamed by the remote server on the display screen 730 in addition to tactile element control logic to activate relevant ones of the tactile elements 710 in an appropriate manner and provide tactile feedback to the user in synch with the displayed content. The commands related to the activation of the tactile elements 710 can be provided with the content from the remote server. The tactile element control logic stored on the storage medium 750 and executed by the processor 700 interprets the commands received from the remote server to activate the tactile elements 710 appropriately.

In an embodiment, an imaging module 706 also executed the processor 700, can include programming logic such as a display manipulation logic executed by the processor 700 in order to create or manipulate a display based on the input obtained from one or more of the detection system 780 and the visual cortex thought detector 208. The input received from the detection system 780 relates to eye tracking and movements of muscles around the eyes of the user 108. Based on the direction of motion of the eye balls or direction and force of the movements of muscles around the eyes, the display manipulation logic of the imaging module 706 can execute various tasks that would normally be executed by a mouse or a joystick or other user input mechanism. Thus, the user 108 can execute tasks associated with a computing device such as generating text or image data by moving his/her eyes or muscles around the eyes.

In a further embodiment, the imaging module 706 can be employed to change an existing display, generate new elements in a display or remove existing elements in the display based on input received from the user 108 via one or more of the modalities disclosed herein. In an embodiment, the input to change the display can be received from the visual cortex thought detector 208. For example, the user 102 can imagine a geometric pattern with a particular color with his/her eyes closed. While the detection system 780 may not be able to provide user input to the processor 700 with the user's eyes closed and no muscle movements, the visual cortex thought detector 208 can obtain information regarding the user's 108 imagination and the imaging module 706 can execute programming logic to show the user's imagination on the display screen 730 and/or display screen 112. In an embodiment, the input from the visual cortex thought detector 208 can be transmitted by the transceiver 770 to the processor 300 where such input is interpreted and a display based on such input is created. The display thus created is transmitted back to the wearable computing system 250 by the processor 300. In this case, the imaging module 706 is employed to show such received display to the user 108 on the display screen 730. In an embodiment, the I/O module 702 can be further configured to store such user experiences/imaginations that are obtained by the visual cortex thought detector 208 on a local storage device 750 or a remote storage such as the storage medium 310 co-located with the chamber 102 or even a remote server (not shown).

Figure 8:
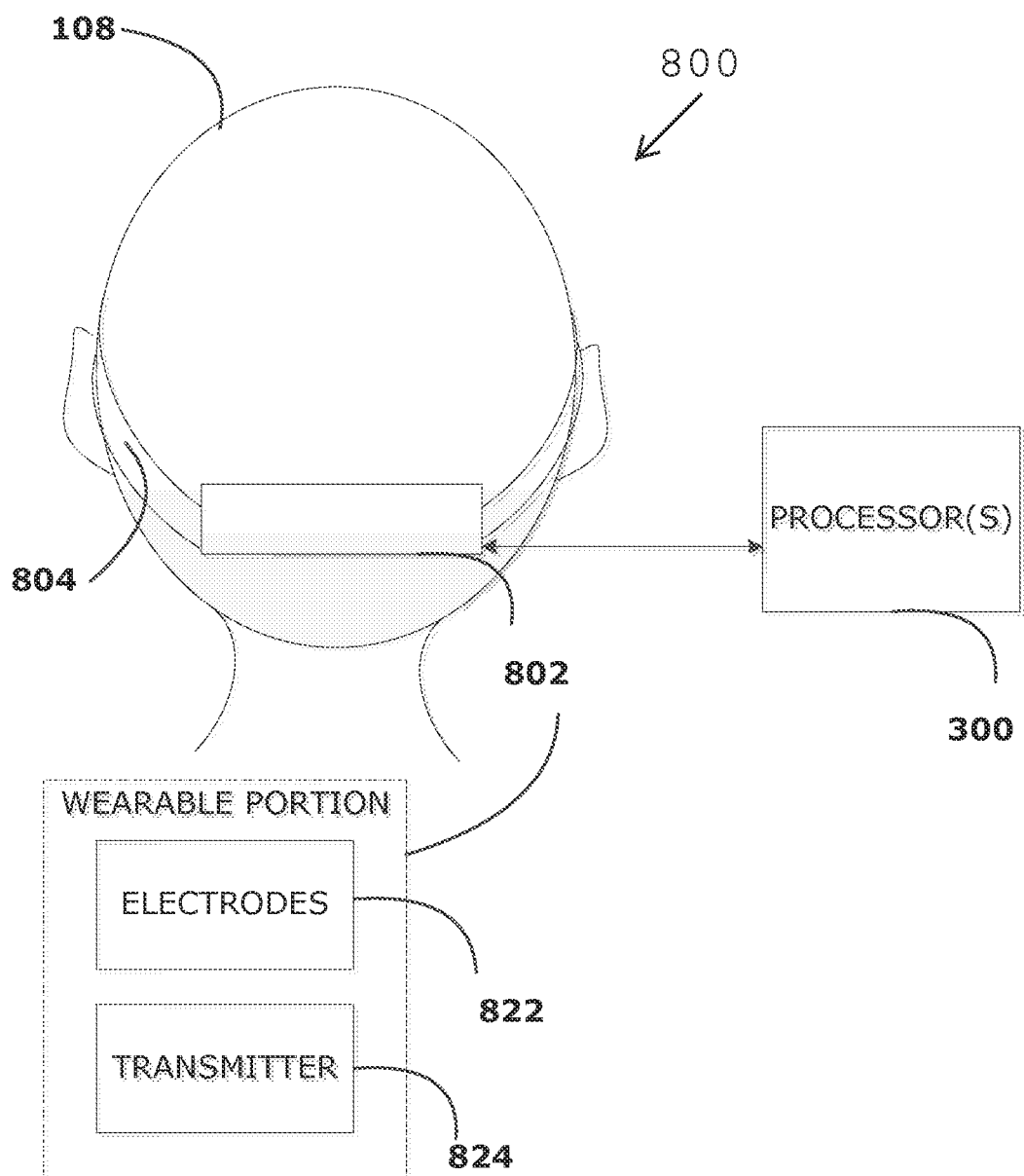
FIG. 8 is a schematic illustration of the visual cortex thought detector in accordance with one embodiment.

FIG. 8 is a schematic illustration 800 of the visual cortex thought detector 208 in accordance with one embodiment. The visual cortex thought detector 208 comprises a wearable portion 802 which is attached to a user's 108 head via an attaching means such as a band 804, which, in an embodiment, can be the flexible frame 202. The wearable portion 802 is attached so that it is in physical contact with the user's 108 visual cortex located on the lower, rear side of the user's 108 brain. A plurality of electrodes or sensors 822 are included in the wearable portion 802 for sensing electrical signals generated in the user's 804 visual cortex.

In an embodiment, technologies available for EEG (electroencelphalogram) can be employed within the visual cortex thought detector 208. Brain cells talk to each other by exchanging tiny electrical signals and an EEG is a non-invasive procedure employed in the medical field for recording such electrical activity. A number of electrodes are placed at different points on the scalp of a person to detect voltage fluctuations caused by ionic flow of current between the brain cells. Experiments have found that when people visually imagine something, their eyes move in a manner that they would move if they were actually looking at the object of their imagination. For example, if a person imagines a skyscraper, the person's eyes move in a top-down manner. Similarly if the person imagines a train, the person's eyes would move side to side. The occipital cortex (also called the visual cortex), at the back of the head is one of the first areas of the human brain where information coming in from the user's 108 eyes arrives and where a lot of work of understanding what the user 108 is seeing goes on. Experiments related to the brain activity also reveal that the visual cortex of the brain is particularly active when people imagine or look at an object in their mind's eye. The wearable portion 802 of the visual cortex thought detector 208 is therefore placed at the rear of the user's 804 head near the visual cortex.

The wearable portion 802 of the visual cortex thought detector 208 can be communicatively coupled to the processor(s) of the immersive experience system 100, for example, via the transmitter 824 or via transceiver 770 associated with the wearable computing system 250. In an embodiment, the display manipulation logic 3062 executed by the processor(s) 300 can process data signals from the wearable portion 802. In an embodiment, the data from the visual cortex thought detector 208 can indicate a particular input the user 108 desires to provide to the immersive experience system 100. For example, the user 108 can provide signals to the wearable portion 802 that may include but not limited to inputting data or selecting commands to manipulate content such as manipulating a game avatar, normal user interface functions such as cut-copy-paste and the like. The I/O module 302 of the immersive experience system 100 can provide the user's 108 desired output to the display screen 112. Although the visual cortex thought detector 208 is shown as one component located at one part of the wearable computing system 100 and in contact with a single portion of the user's 108 brain, it may be appreciated that this is not necessary. The visual cortex thought detector 208 can include a plurality of sensors that can be in contact with a plurality of portions of the user's 108 brain as needed to collect thought information.

Figure 9:
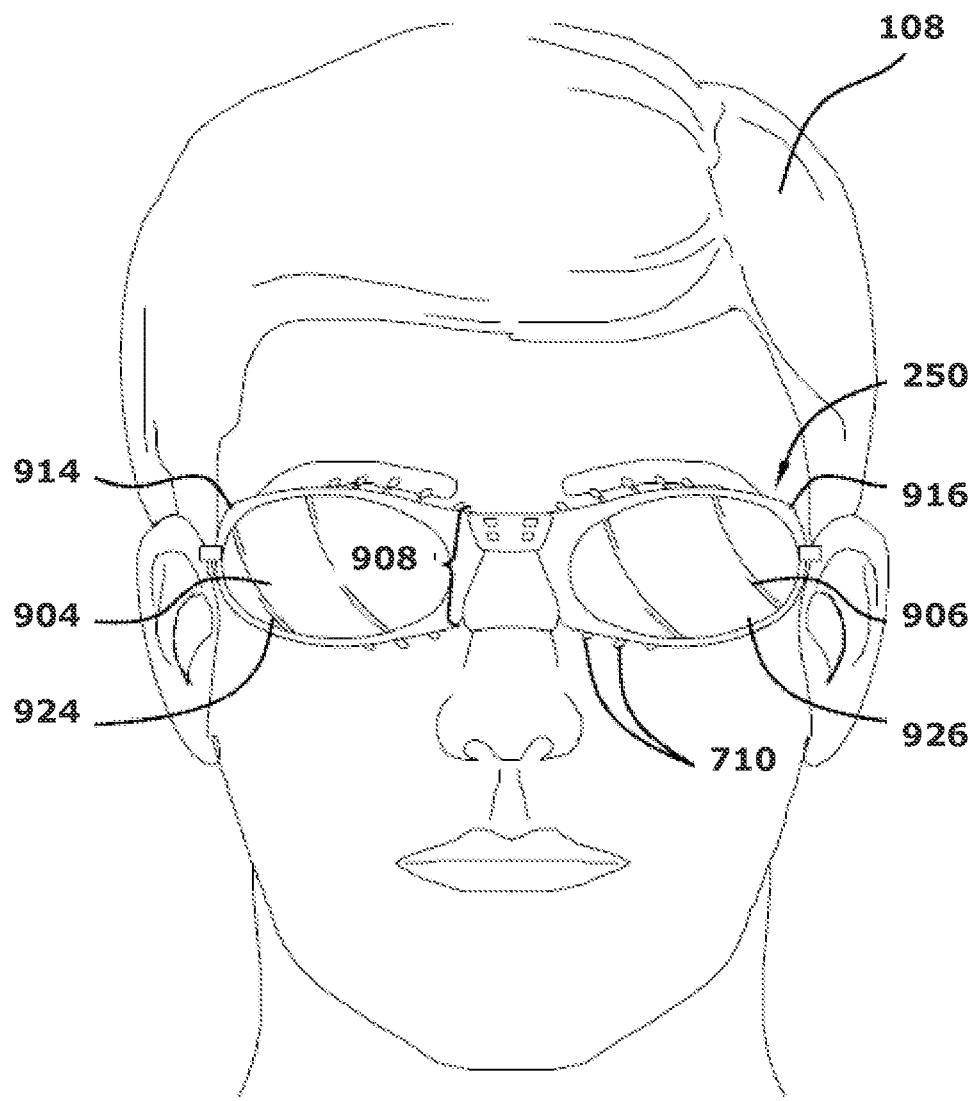
FIG. 9 shows a user with the wearable computing system in accordance with one embodiment.

FIG. 9 is an illustration of the user 108 employing the wearable computing system/device 250. The computing system comprises two symmetric eye pieces 904 and 906 each of which is configured to be used singly or to be used with the other symmetric eye piece. In an embodiment, both the eye pieces 904, 906 can comprise identical components. In an embodiment, the various components of the wearable computing system 250 can be distributed asymmetrically between the two eye pieces 904, 906 such that each eye piece 904, or 906 is configured for specific usage in addition to being used together for other applications. In an embodiment, the eye pieces 904 and 906 are detachably coupled to the bridging element 908 to facilitate such flexible usage. Each eye piece 904, 906 comprises a respective frame 914, 916 that includes a respective display screen 924 and 926 which when the eye pieces 904, 906 are used together form a stereoscopic display for the user 108. The frames 914, 916 are made from flexible material so that they are configured for shape-mating engagement with the eye sockets of the user 108. Thus, the frames 914/916 are configured to be able to conform to the shape of the eye socket of the user 108 in a manner that blocks ambient light surrounding the user 108 from leaking into the field of view of the user 108. In an embodiment, the frames 914 and 916 can be hollow and have space within them to allow electrical interconnections between various component parts of the wearable computing system 250.

In an embodiment, display screens 924, 926 can be flexible OLED (organic light emitting diode) in order to conform to the shape of the user's 108 face along with the flexible frames 914, 916. In an embodiment, the screens 924, 926 can have variable levels of opaqueness or transparency to facilitate using the wearable computing system 250 in synchrony with the display screen 112 of the immersive experience system 100. Applying charge to the OLED display screens 924/926 can vary their transparency for use in different settings.

The wearable computing system 250 also additionally comprises a plurality of tactile elements 710 that provide tactile feedback to the user 108 around the eyes of the user 108 where the tactile elements 710 are in contact with the user's 108 skin. For example, a subset of the tactile elements 710 can convert electrical energy to mechanical motion such as vibration or other forms of energy such as heat energy to provide the tactile feedback to the user 108. In an embodiment, the tactile elements 710 are small structures having varying physical characteristics that include physical and electrical connections with the frames 914/916 as will be detailed further herein. In an embodiment, at least a subset of the tactile elements 710 can be capable of independent motion. In an embodiment, all the tactile elements 710 can be employed at the same time to provide the tactile feedback or particular ones of the tactile elements 710 can be selected at any time to provide the tactile feedback to the user 108. Various kinds of tactile feedback can be provided to the user 108 based on the functionality built into the different tactile elements 710. By the way of illustration and not limitation, a first subset of the tactile elements 710 can comprise heating elements, a second set of the tactile elements can be moveable or configured for vibration at various frequencies, or a third subset of tactile elements can exert pressure. Again it may be appreciated that different tactile elements 710 can have different feedback mechanisms associated with them or all the tactile elements can each have all the tactile feedback mechanisms built into it so that combinations of different tactile elements can be used to provide a particular kind of tactile feedback.

The tactile feedback provided to the user 108 can be associated with the content so that the plurality of tactile elements 710 are activated in consonance with the displayed content such as a movie or a video game in order to add an extra dimension to the user experience. In an embodiment, the various tactile elements 710 can be mapped to various parts of an avatar (not shown) the user 108 is interacting with or associated with so that the experiences of the avatar in the virtual world can be translated to the user 108 or experienced or felt by the user 108 via the tactile elements 710. Thus, the pressure of a touch, a location of the touch and texture of the touch experienced by the avatar can be translated to the user 108 as part of the user experiences in the immersive environment of the wearable computing device 250. The avatar can additionally interact with avatars of other users and the tactile feedback provided to the user 108 can be further modified based on the interactions between the avatar of the user 108 and the avatars of the other users.

In an embodiment, the wearable computing system 250 not only provides content and associated tactile feedback to the user 108 but also facilitates the user 108 interaction with the content. In an embodiment, the wearable computing system 250 comprises a detection system 780 that detects movement in the various parts of the eyes or eye sockets of the user 108 which facilitates the user 108 to interact with the displayed content. In an embodiment, the detection system 780 can include a camera and a photodiode to track movements of various parts of the user's 108 eyes. In an embodiment, the detection system 780 can be employed to detect the user's 108 interaction with content provided on the display screens 924/926. In an embodiment, the detection system 780 can be employed to detect the user's 108 interaction with content provided on the display screen 112, for example, when the screens 924/926 are rendered transparent as detailed herein. In the case where the user is interacting with the display screen 112, it may be appreciated that information from the detection system 780 is communicated to the processor(s) 300 of the immersive experience system 100 that control the display screen 112.

In an embodiment, movements of the user's 108 eye balls such that the user 108 glancing at a certain icon on the display screen(s) 924/926/112 for a predetermined time period can act as a gesture such as a mouse click that can cause the processors 300/700 to execute the particular task associated with the gesture such as selecting the icon. Similarly, movement of the user's 108 eyes after such selection can cause movement of the selected icon along the direction of motion of the user's 108 eye balls and the user 108 subsequently stopping the movement at a particular second point can act to drop the icon at that particular point. The detection system 780 can also be configured to detect finer differences or nuances in the movements of the different parts of the eye sockets covered by the wearable computing system 250 such as a user 108 or wearer closing the eyes for different time periods, squinting, raising one or more brows.

In an embodiment, the tactile elements 710 can also be configured to be part of the detection system 780 that detects user movements even while providing tactile sensations to the user 108. The plurality of tactile elements 710 can have subsets of elements with different shapes that comprise different types of transducers collecting different vectors associated with the user's 108 eye movements or gestures of eye muscles. For example, the tactile elements 710 can also comprise transducers that are in physical contact with the facial muscles of the user 108 to detect movement in such muscles and generate corresponding electrical signals that can be fed back to the processor and the display on the display screens 924, 926 can be manipulated accordingly. In an embodiment, the location of a tactile element transmitting the electrical signal and the strength of the signal can be used to detect particular movements of the user's 108 facial muscles which can be mapped to provide particular input to the processor. Various eye movements and gestures can thus be tracked and mapped to specific types of input that can be used manipulate content is particular manner. Thus, the wearable computing system 250 can eliminate the need or complement other equipment such as joysticks or data gloves which are normally used with such wearable computing systems to receive user input.

Figure 10:
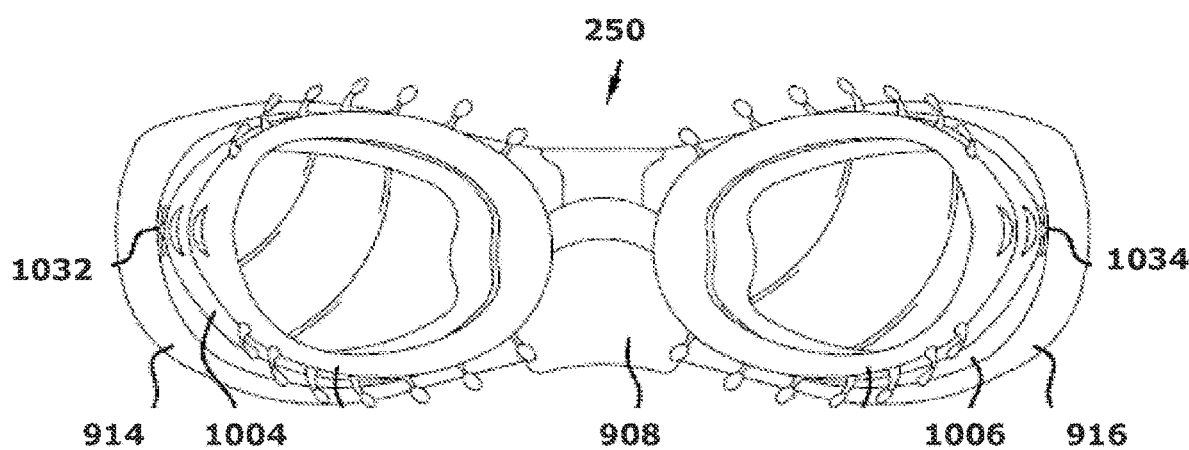
FIG. 10 is an illustration that shows a view of the wearable computing system that faces the user in accordance with embodiments of the present disclosure.

FIG. 10 is an illustration that shows another view of the wearable computing system 250 that faces the user 108 when the user 108 is wearing the wearable computing system 250 on his/her body. The flexible frames 914, 916 each includes a suction mechanism or eye gaskets 1004, 1006 that facilitates the wearable computing system/device 250 to be firmly attached the user's 108 face so that there is very little or no leakage of ambient light into the field of view of the user 108 or into the space between the user's 108 eyes and the display screens 924, 926. In addition, the wearable computing system 250 can include speakers 206 at appropriate locations such as near the ears as shown in FIG. 2 in order to provide acoustic feedback to the user. The wearable computing system 250 can also include within the bridging member 908, power source(s), one or more processors 700 for executing tasks such as controlling the display screens 924, 926, providing Wi-Fi, infrared or other wireless communication, and other processing tasks such as controlling other components like the tactile elements 710 on the wearable computing system 250.

In an embodiment, the visual cortex thought detector 208 which can be detachably coupled to the wearable computing system 250, for example, via a coupling means, such as a band 806. The ends of the band 806 can be detachably coupled to the ends 1032 and 1034 of the wearable computing system 250 in a manner that the band 806 can encircle the rear of the user's 108 head. This arrangement facilitates the visual cortex thought detector 208 to record thoughts from the visual cortex located on the rear side of the user's 108 brain.

Figure 11:
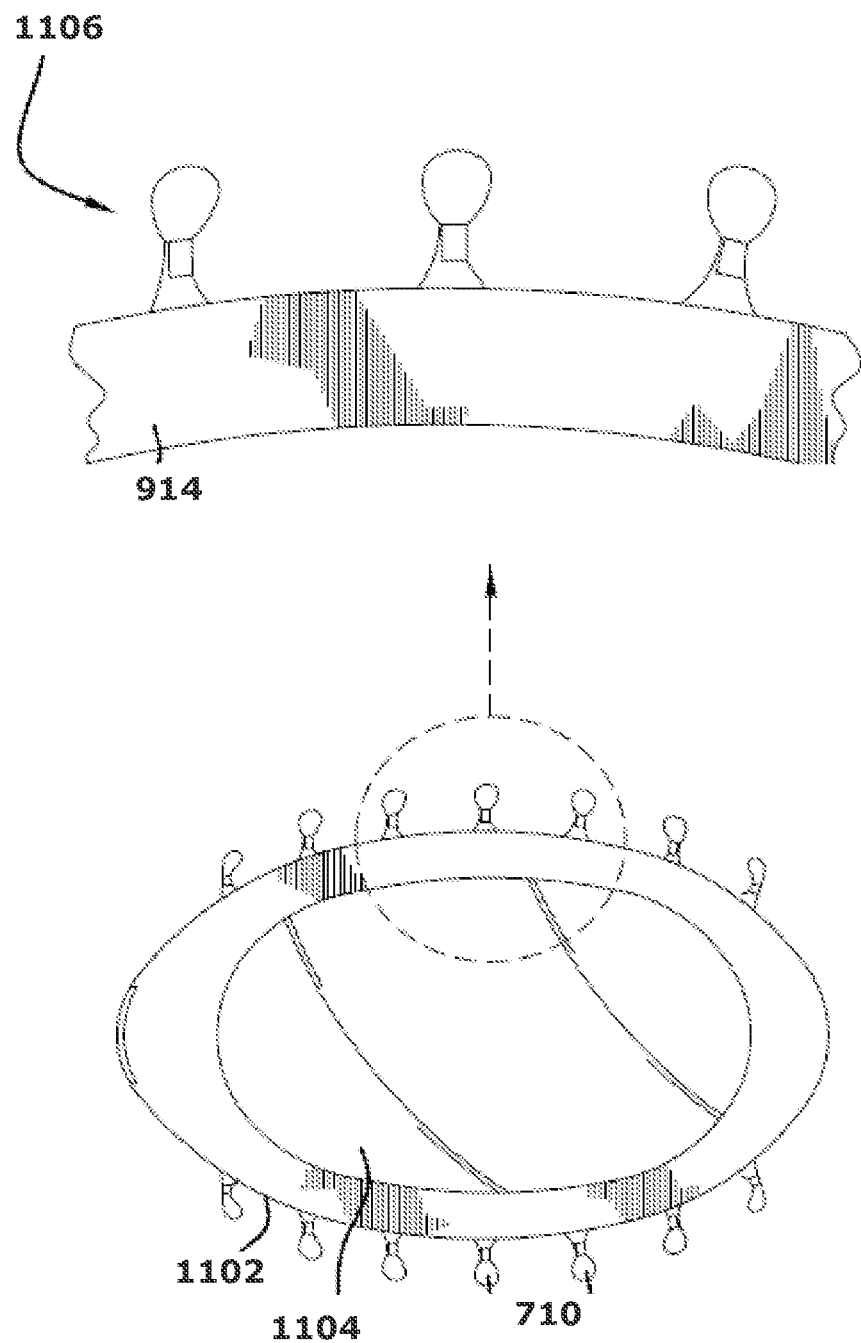
FIG. 11 is an illustration that shows some example details of the tactile elements in accordance with embodiments of the present disclosure.

FIG. 11 is an illustration that shows some example details of the tactile elements 710. The plurality of tactile elements 710 are arranged along the occular ring structure 1102 comprised within the eye gaskets 1004, 1006 along a perimeter of the aperture 1104. When one of the eye gaskets 1004, 1006 is used in the wearable computing system 250, the aperture 1104 would include a display screen 924/926. The plurality of tactile elements 710 can have different structural details in order to provide different tactile sensations. By the way of illustration and not limitation, different tactile elements can be made of different materials, bent at different angles as shown in the close up view 1106 of the occular ring 1102 or have different contact surfaces. Such variability in the structures of the tactile elements 710 facilitates generating different pressure levels or providing different areas of contact or different textures associated with the feelings provided by the tactile feedback given to the user 108. In an embodiment, different ones of the tactile elements 710 may have different shapes and can be arranged in different ways on the frames 914/916. For example, the tactile elements 710 can be arranged such that the lengths of the tactile elements 710 vary gradually from one tactile element to an adjacent element or the angle of inclination of the tactile elements can vary gradually as shown on the frame 914 at 1106.

Figure 12:
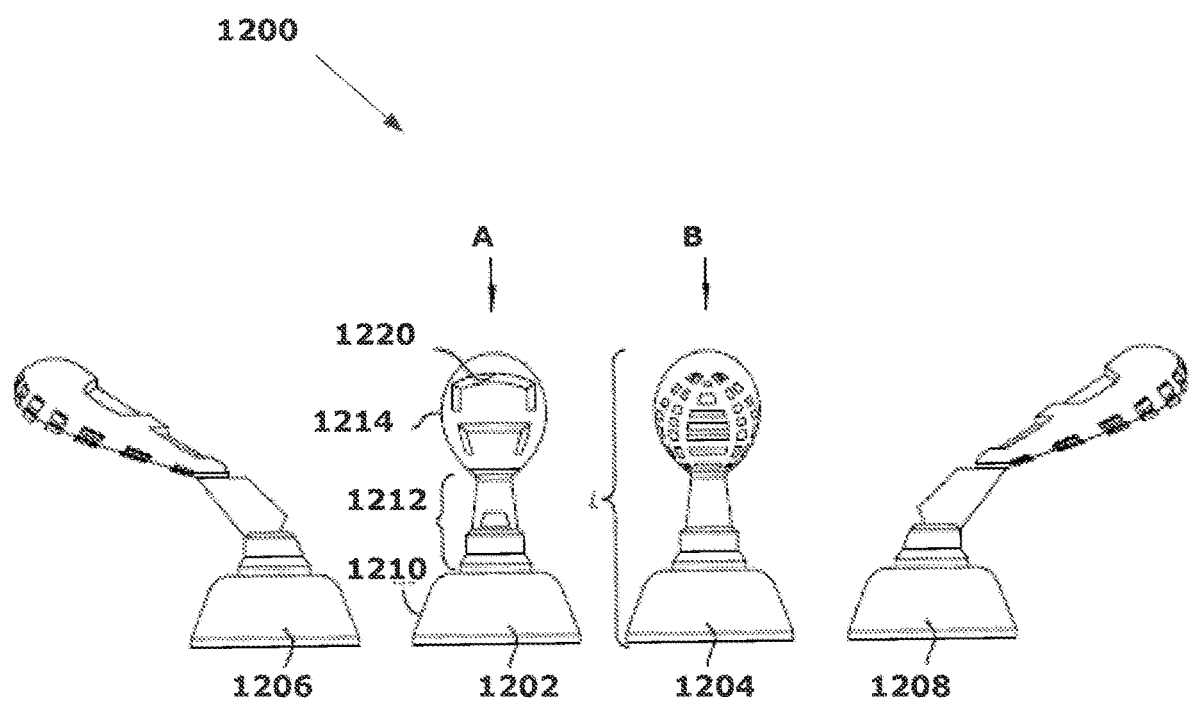
FIG. 12 illustrates various views of the tactile elements in accordance with embodiments of the present disclosure.

FIG. 12 illustrates various views of one 1200 of the tactile elements 710 in accordance with embodiments of the present disclosure. In different embodiments, the tactile elements 710 can be made from elastic polymers or metals or combinations thereof such as metal arms coated with polymer skin padded with gels that include certain level of elasticity to not only withstand the vibrations that are generated while providing the tactile feedback to the user but also to transmit the vibrations generated by the user 108 as different types of user input.

The views 1202, 1204, 1206 and 1208 together show an all round view of one of the tactile elements 710. In particular, 1206 and 1208 are cross sectional views of 1202 and 1204 as seen from point of views A and B respectively. Each tactile element 1200 has a base portion 1210, a neck 1212 and a head 1214. In an embodiment, the entire length L of the tactile element 1200 from center of the base portion 1210 to the tip of the head 1214 can approximately vary between 1-3 centimeters. In an embodiment, different tactile elements can have different lengths based on their location on the frames 914/916 and the area the tactile elements are supposed to contact. The base portion 1210 connects the tactile element 1200 to the frame 914/916 of an eye piece 904/906. In an embodiment, the base portion 1210 is hollow in order to allow coupling the tactile element 1200 electrically to other parts of the wearable computing system 250 such as the processor(s) in the bridge portion 908. Thus, the base portion 1210 not only facilitates physically connecting the tactile element 1200 to the frame 914/916, but also facilitates electrically coupling the tactile element 1200 to other parts of the wearable computing system 250.

The neck portion 1212 connects the base portion 1210 to the head 1214 of the tactile element 1200. Different tactile elements 710 can have different lengths associated with the neck portion. Various tactile elements 710 can also have their necks bent at different angles in order to vary the kind sensation provided to the user 108 as tactile feedback. In an embodiment, the neck 1212 can also be hollow in order to electrically couple the head 1214 to other parts of the wearable computing system 250. In an embodiment, the neck 1212 can be a solid structure connecting the head 1214 to the base portion 1210.

The head 1214 of the tactile element 1200 contacts the user's 108 skin in order to provide the tactile feedback. In an embodiment, the head 1214 can be made of similar materials as the other portions of the tactile element 1200 but can be configured with a specific pattern 1220 to provide a particular type of sensation on the user's skin. Different patterns can be formed on the head portions of different tactile elements as shown for the head portions of the tactile elements 710. In an embodiment, the head 1214 can be configured of a different material than the other parts of the tactile element 1200. In an embodiment, the head 1214 can be made of the same material as the remaining portions of the tactile element 1200 but can be coated or covered with another material. In an embodiment, the head portions of different tactile elements 710 can be configured according to different embodiments thereby creating various types of touch sensations.

As described supra, the tactile elements 710 can also be part of the system to detect movements of facial muscles of the user. By the way of illustration and not limitation, movements in the user's 108 skin can cause movements of the tactile elements 710. The attributes of user's 108 reaction, such as, strength and duration of movements of the facial muscles can thus be detected and recorded. Different feedback, comprising one or more of visual, audio or tactile modes can be provided based on the attributes of the user movements.

Figure 13:
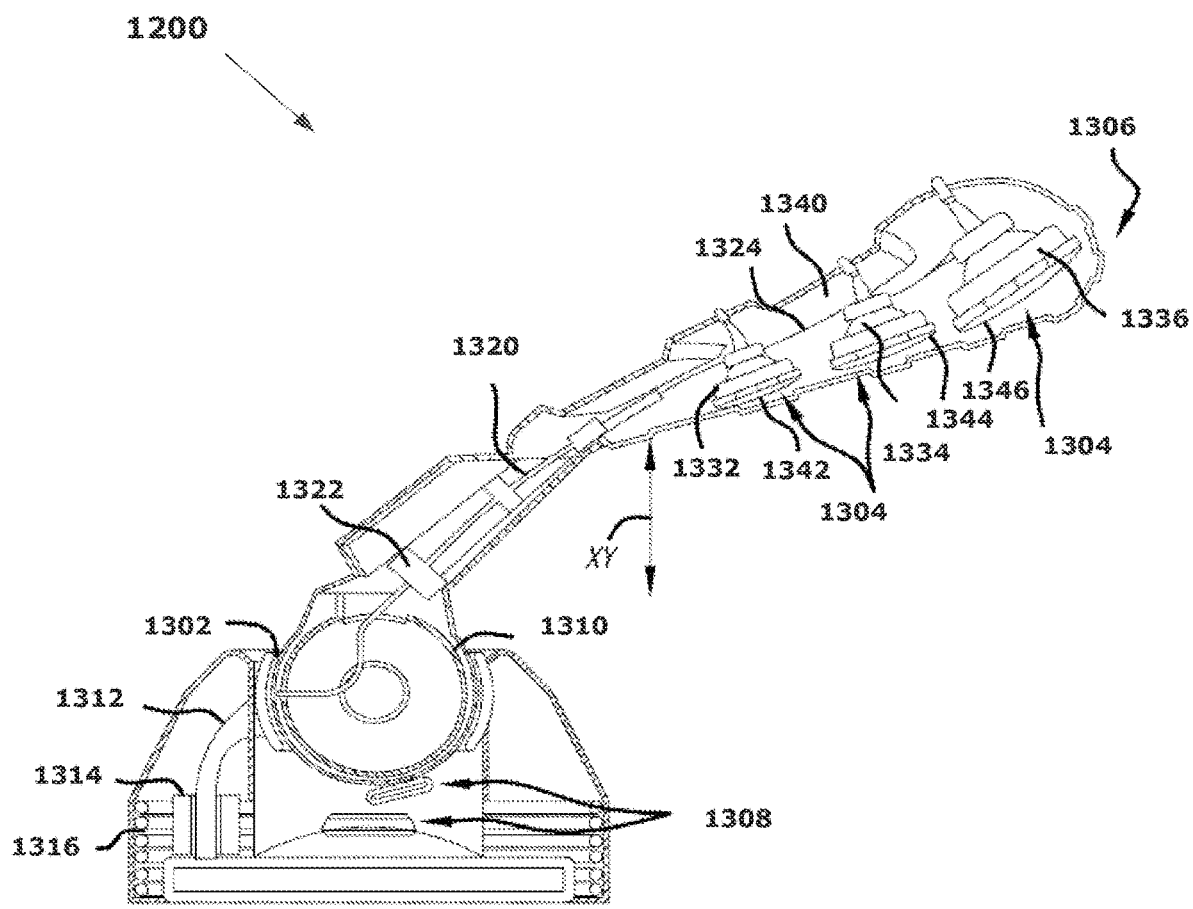
FIG. 13 is a schematic diagram showing a cross section of one of the tactile elements in accordance with embodiments of the present disclosure.

FIG. 13 is a schematic diagram showing a cross section of one of the tactile elements 710, for example, 1200 in accordance with embodiments of the present disclosure. As described supra, the tactile element 1200 comprises a hollow base portion 1210, a neck 1212 and a head 1214. The base portion 1210 not only connects the tactile element 1200 to a frame of an eye piece 904/906, but it also houses the actuation mechanism. The actuation mechanism can be configured in a bi-directional manner so that it not only provides tactile feedback to the user 108 but also collects user input via various movements executed by the user's 108 muscles around the eyes. The neck 1212 connects the base to the head 1214 so that the head 1214 can be actuated to provide an appropriate tactile feedback or conversely, the movements of the head 1214 can be detected to record the necessary attributes of the user input.

In accordance with an embodiment, the actuation mechanism comprises a signal contact plate 1302 that is in a form-fitting contact with a spherical body 1310 to form a ball and socket joint. The spherical body 1310 is not only capable of freely rotating along the various axes passing therethrough but can also tilt along the different axes within the signal contact plate 1302. A pair of magnets 1308 together with the electrical coil 1316 provides mechanical actuation for the rotating spherical body 1310 when current is passed through the coil 1316. One magnet of the pair 1308 is attached to the rotating sphere 1310 while the other magnet is fixed to the bottom of the base 410. Conversely, the pair of magnets 1308 also serve to induce current in the coil 1316 when the rotating sphere 1310 is moved due to the mechanical motion of the head 1214 and the neck 1212 caused by user input such as, the user 108 moving the muscles in the eye socket which are in contact with the tactile element 1200.

A connecting wire 1320 including ribs 1322 is attached to the rotating sphere 1310 and runs through the length of the neck 1212 and at least part of the head 1214 portion interconnecting the various elements therein. Rotating the sphere 1310 within the signal contact plate 1302 by passing the current through the coil 1316 therefore pulls or pushes the connecting wire 1320 thereby actuating the neck 412 and the head 414 along the vertical axis XY. In addition to providing mechanical actuation, the connecting wire 1320 can also include electrical connections for the speaker array 1304.

In an embodiment, the speaker array 1304 can comprise of one or more speakers 1332, 1334 and 1336 that are configured to provide tactile feedback, such as vibrations. In an embodiment, the transmitted vibrations facilitate bone conduction so that audio feedback can also be provided through one or more of the speakers in the array 1304. It can be appreciated that the speakers 1332, 1334 and 1336 can be configured for audio feedback via bone conduction based on the location of the tactile elements 710. For example, tactile elements 710 in contact with softer muscle portions of eye sockets, such as, under the eyes may not be configured for audio feedback via bone conduction whereas tactile elements located on the upper part of the frames 912/914 that contact the brow or the bony nose bridge of the user 908 can be configured for bone conduction according to embodiments described herein. The different speakers 1332, 1334 and 1336 can vary in sizes and power attributes to provide a variety of tactile vibrations based on the power and area of contact of each of the array of speakers 1304. In an embodiment, the head 1214 can be made up of plastic and/or metal combination in the portion 1340 which is not in contact with the user's 108 skin while the faces of the speakers 1342, 1344 and 1346 are arranged within a gel pad 1306 in order to provide a softer feel for the user 108. In an embodiment, the gel pad 1306 can comprise additional elements such as, heating elements (not shown), to provide additional types of tactile feedback to the user 108.

It may be appreciated that the structures in FIG. 12 and FIG. 13 are only shown by the way of illustration and not limitation and that the tactile elements 710 can be configured to have other structures in accordance with embodiments detailed herein. For example, the tactile elements 710 can be configured as protrusions on the frames 912, 914 comprising spherical or cylindrical or other shapes. In an embodiment, different ones of the plurality of tactile elements 710 may have different shapes and can be arranged in different ways on the frames 912, 914 as discussed supra. In an embodiment, the tactile elements 710 can comprise electrical suction cups to provide a particular type of tactile feedback by pulling the skin of the user 108. In an embodiment, the tactile elements 710 can comprise tiny pin holes located on the frames 912, 914.

Figure 14:
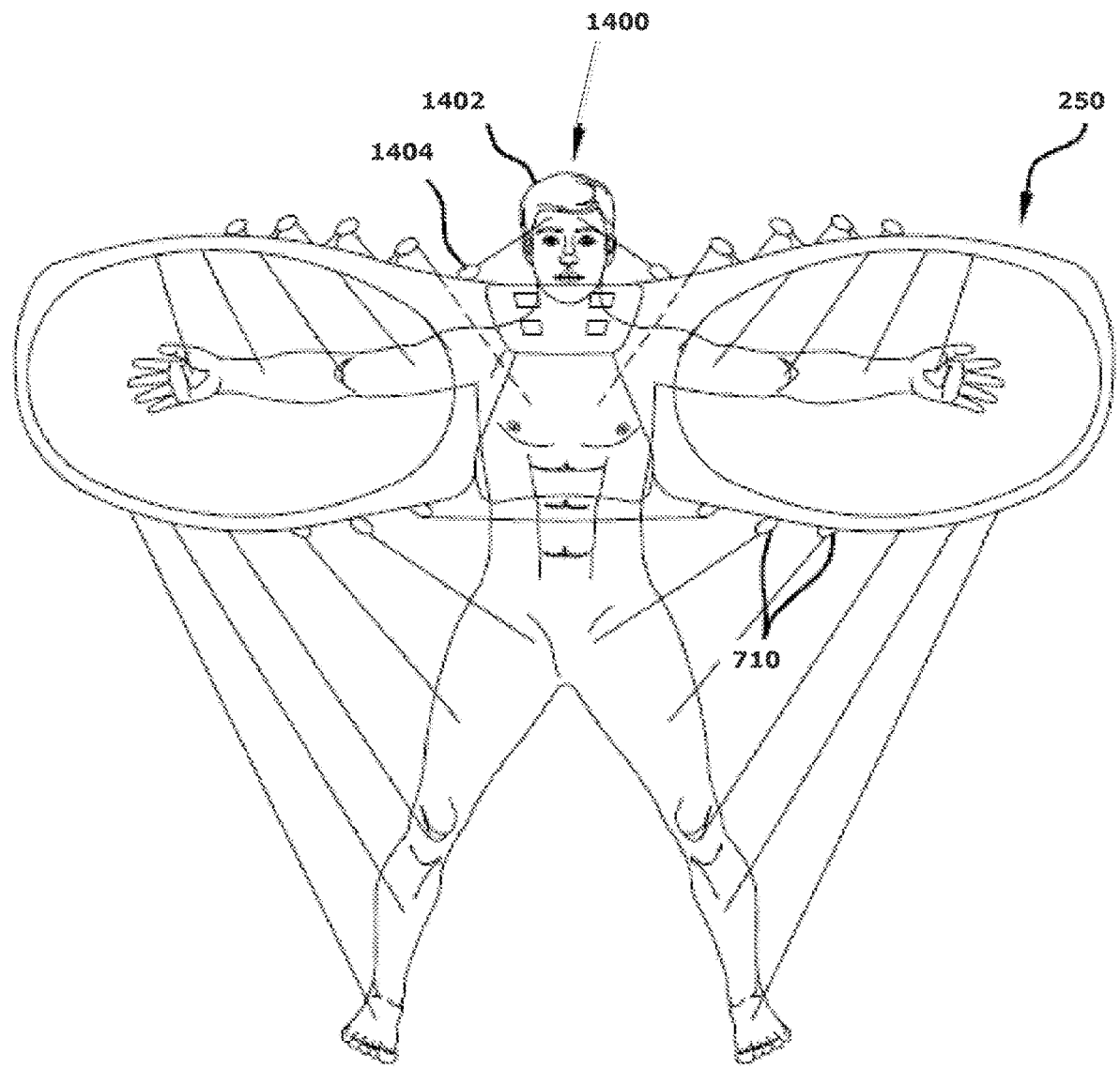
FIG. 14 is an illustration that shows the plurality of tactile elements providing to the user, tactile feedback that is synchronous with a particular display that comprises an avatar in accordance with embodiments of the present disclosure.

FIG. 14 is an illustration that shows the plurality of tactile elements 710 providing to the user 108, tactile feedback that is synchronous with a particular display that comprises an avatar 1400. In an embodiment, the avatar 1400 can be shown on the display screen 112. In an embodiment, the avatar 1400 can be shown on one or more of the display screens 924, 926. In this embodiment, each of the plurality of tactile elements 710 are mapped to provide tactile feedback associated with, for example, the virtual-world experiences of the avatar 1400 that may be associated with the user 108. Each of the plurality of tactile elements 710 is associated with a certain one of the body parts of the avatar 1400 so that if a particular body part such as, the head 1402 of the avatar 1400 experiences a particular sensation in the virtual world as seen by the user 108, then the tactile element 1404 mapped to the head 1402 is activated to give a tactile feedback to the user 108 at the point of contact between the tactile element 1404 and an area above the user's 108 right eye. For example, if the avatar 1400 touches an object with the portion 1402 of his head, the tactile element 604 can be activated to apply pressure on the user's 108 brow at the point of contact. Similarly, the avatar's 1400 experiences of heat, pressure, or touch of another living being or non-living entity or other physical sensations can be provided to the user 108 via appropriate activation of the one or more tactile elements 710. It may be appreciated that a human avatar 1400 is shown only by the way of illustration and that the plurality of tactile elements 710 can be mapped to other living or non-living avatars and the virtual-world experiences of such avatars can be relayed to the user 108 not only via visual or audio channels but also as tactile sensations through the tactile elements 710. This can facilitate providing user 108 with tactile sensations associated with other living beings such as flying of a bird or sensations associated with non-living entities such as racing of a car.

In an embodiment, the avatar 1400 can be made to interact with the virtual world displayed on the screen(s) 112, 924, 926 via the movement of the eyes and gaze tracking of the user 108. For example, the user 108 staring at the avatar 1400 for a predetermined time period can facilitate selection of the avatar 1400 for interaction. Similarly, moving the gaze in a particular direction subsequent the selection can move the avatar 1400 appropriately and resting the gaze at a point for a predetermined time can fix the avatar 1400 at the location where the user's 108 gaze is resting or raising the user's 108 eye brows can cause the avatar 1400 to jump. As the eyes move rapidly, the time periods associated with the aforementioned user gestures can be around the order of a few seconds. The tactile feedback and gesture mappings can be programmed into the content that is provided by the wearable computing system 250. For example, video game applications or movies can be created for the wearable computing system 250 that comprise tactile feedback and user interaction mechanisms built into them.

In an embodiment, where the computing system 250 display the avatar 1400 comprises a visual cortex thought detector 208, the avatar 1400 can be manipulated based on input provided by the visual cortex though detector 208. As described supra, the electrical signals generated by the visual cortex of the user 108 can be detected and interpreted to change the state of the avatar 1400 accordingly. By the way of illustration and not limitation, the avatar 1400 can be moved up or down or side ways or size of the avatar 1400 can be changed based on the input from the visual cortex thought detector 208.

Figure 15:
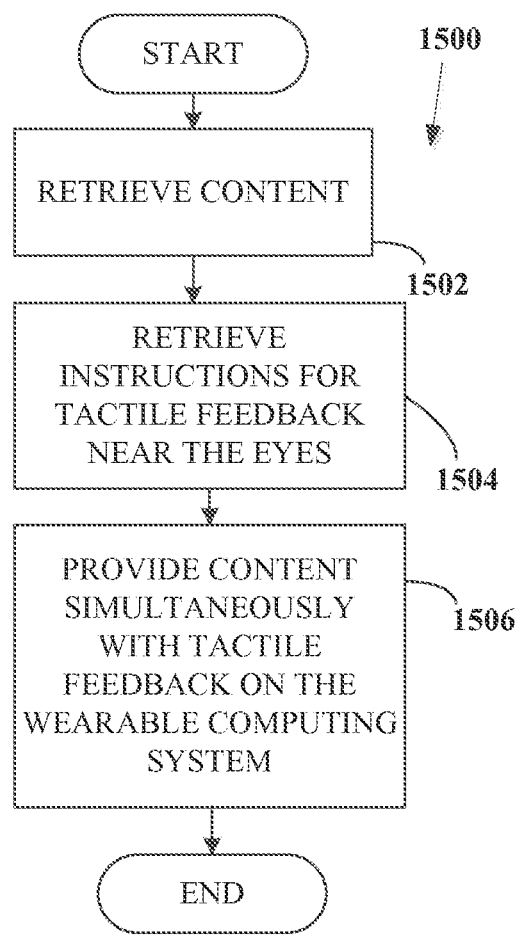
FIG. 15 shows a flowchart illustrating an embodiment of a method of providing content to the user as executed by the wearable computing device in accordance with an embodiment.

FIG. 15 shows a flowchart 1500 illustrating an embodiment of a method of providing content to the user 108 as executed by the immersive experience system. The method begins at 1502 with providing content to the user 108 via the display screen(s) 112, 924, 926 and/or the audio components 740. In an embodiment, the user 108 is shielded from external stimuli by the isolation chamber 102. In different embodiments, the content provided to the user 108 can comprise one or more of audio and video content associated with tactile feedback data. The content can be retrieved from a local storage device 770 or a remote server 810 according to embodiments described herein. The instructions to provide tactile feedback are also retrieved along with the content at 1504. The retrieved content and the tactile feedback via activation of the appropriate tactile elements 110 are simultaneously provided to the user 108 as shown at 1506. Various sensations of pressure, heat, prolonged or fleeting sensations of touch with living and non-living entities can be provided at 1506 by activation of the tactile elements 110 according to embodiments described herein.

Figure 16:
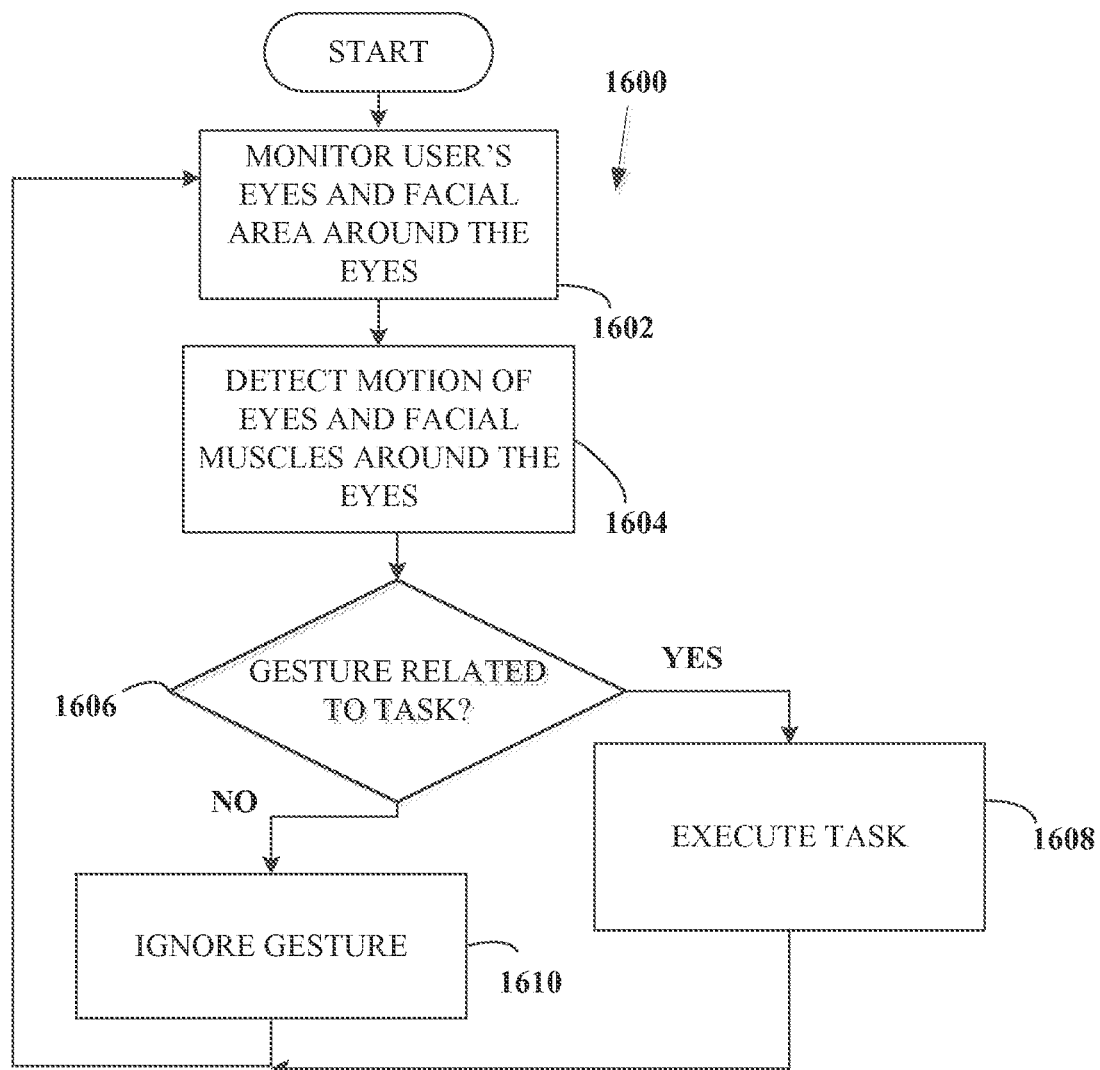
FIG. 16 shows a flowchart illustrating an embodiment of a method of providing interactive content to the user as executed by the wearable computing device in accordance with an embodiment.

FIG. 16 shows a flowchart 1600 illustrating an embodiment of a method of providing interactive content to the user 108 as executed by the immersive experience system 100. This method can be executed in conjunction with the method described above in FIG. 15. The method begins at 1602 with observing or monitoring the movement of the user's 108 eyes and facial movements around the user's eyes using one or more of the tracking module 350 and/or detection modules/systems 780. The motion of the eyes and/or eye gestures are detected as shown at 1604. At 1606 it is determined if the movement of the user's 108 eyes is mapped to specific task-related gestures. Such gestures can include without limitation closing eyes for a predetermined time period, widening the eyes, moving eyes at a particular speed in a specific direction, staring hard at an icon, raising one or both the eyebrows, squinting or combinations thereof. For example, in the case of combination of gestures, the user 108 staring at an object on the screen(s) 924, 926 for a predetermined time period can cause the object to be selected and subsequently moving the eyes in a particular direction can cause the object to be moved on the screen in the corresponding manner. Some of the gestures can be inadvertant or involuntary motion which does not reflect any user intention. The immersive experience system 100 can be configured to differentiate such involuntary gestures from intentional gestures by for example, associating particular gestures with predetermined time periods. If it is determined at 1606 that particular gestures are related to specific task(s), such tasks are executed by the immersive experience system 100 in response to the detected eye gestures or eye motion at 1608 else, the gesture or motion is ignored as shown at 1610. In either case, the immersive experience system 100 continues to monitor user movements at 1602.

Figure 17:
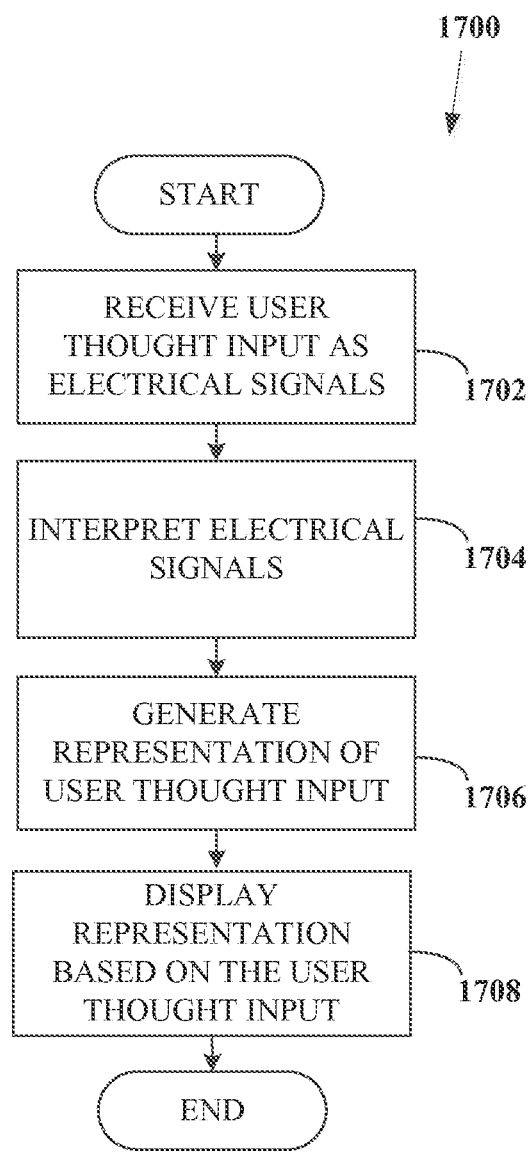
FIG. 17 shows a flowchart illustrating an embodiment of a method of providing interactive content to the user as executed by the wearable computing device in accordance with an embodiment.

FIG. 17 shows a flowchart 1700 illustrating an embodiment of a method of providing interactive content to the user 108 as executed by the immersive experience system 100. The method begins at 1702 with the immersive experience system 100 receiving user thought input. The visual cortex located at the rear of the user's 108 head is capable of producing visual representations. If an instrument that records electrical signals from the visual cortex of the user's 108 brain is placed at the rear of his/her head, a graphical representation of the user's 108 imagined pattern or pattern visualized in the user's brain can be generated. Thus, the user 108 can execute tasks such as generating text input just by visualizing the appropriate letters and the immersive experience system 100 will be able to detect and generate a text document that is visualized by the user 108. Similarly, the user 108 can visualize patterns, colors or other graphics which can be detected and reproduced by the visual cortex thought detector 208. For example, the user 108 can visualize a vertical movement of an avatar and based on the electrical signals from the user's 108 brain, the avatar can be moved accordingly. The electrical signals are interpreted or decoded as shown at 1704 to obtain pattern and/or color information associated with the user's 108 thought input as obtained by the visual cortex thought detector 208. A graphical representation of the user's 108 imagination is generated at 1706 and displayed on the display screen(s) 112, 924 or 926 as shown at 1708.

In an embodiment the method of FIG. 17 can be used in conjunction with the method outlined in FIG. 15. Content with or without tactile feedback can be provided to the user 108 via the wearable computing system 250 as detailed in FIG. 15 and the user's 108 imagination can be used to alter the provided content as detailed in FIG. 17. The content changed in accordance with the user's 108 imagination can be displayed on the display screen(s) 112, 924 or 926.

In an embodiment, the functionality of the visual cortex thought detector 208 can be distributed so that only the detection of electrical signals from the user's 108 visual cortex is performed by the visual cortex thought detector 208 of the wearable computing system 250 while the tasks such as interpretation of the signals, reproduction of the user's 108 imagination and generation of the graphics from the detected signals are performed at the other portions of the immersive experience system 100 such as the processor (s) 300 or even a remote server (not shown). The graphics thus generated can be displayed on one or more of the display screen(s) 924, 926.

Figure 18:
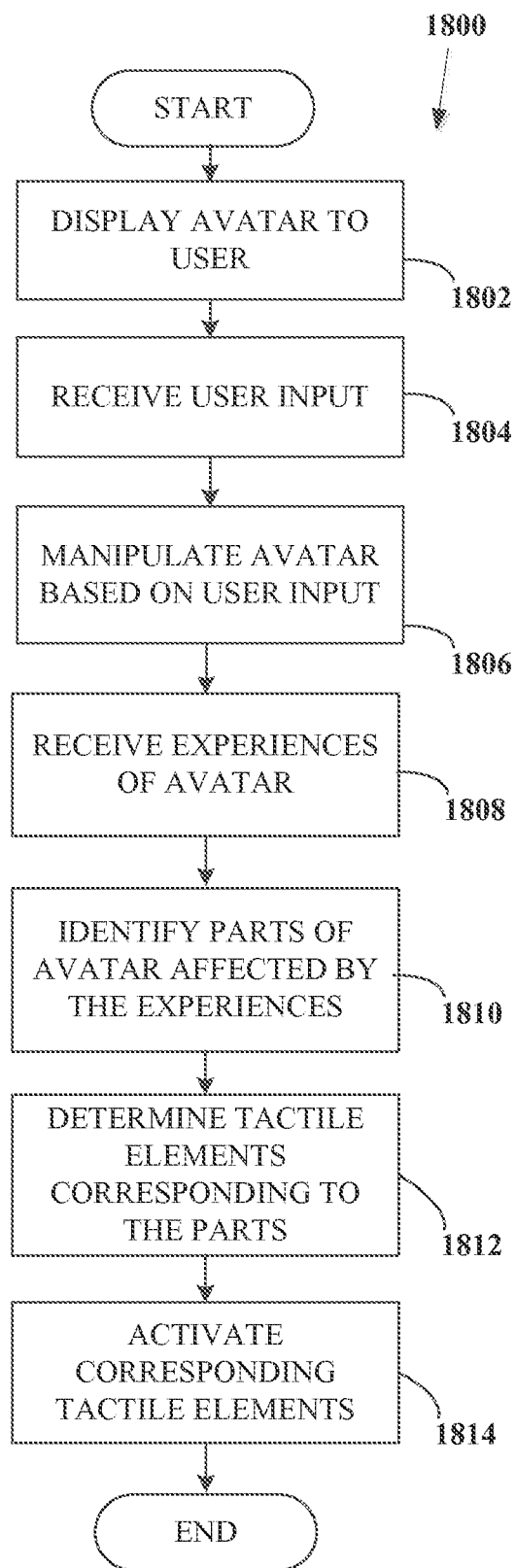
FIG. 18 shows a flowchart illustrating an embodiment of a processor-executable method of providing tactile feedback that is synchronous with a display comprising an avatar.

FIG. 18 shows a flowchart 1800 illustrating an embodiment of a processor-executable method of providing tactile feedback that is synchronous with a display comprising an avatar 1400. The method begins at 1802 wherein a display comprising an avatar 1400 is shown to the user 108 and user input to manipulate the avatar 1400 is received at 1804. As described herein, inputs from various modules such as, the detection system/module 780, can be employed to manipulate the avatar 1400. The avatar 1400 is manipulated based on the user input at 1806. In an embodiment, the user 108 can move his eyes in a particular manner so that such eye motion is detected by the detection system 780 and the avatar 1400 in moved accordingly in a particular direction. In an embodiment, the user 108 can visualize the avatar 1400 moving in the particular direction. Such visualization can be captured as electrical signals by the visual cortex thought detector 208 which provides such input to the immersive experience system 100. The immersive experience system 100 in turn manipulates a display of the avatar 1400 at 1806 in accordance with the signals received from the visual cortex thought detector 208.

The experiences of the avatar 1400 when manipulated based on the user input are received at 1808. For example, the avatar 1400 may come into physical contact with an object in the virtual world when moved based on the user input as described supra. The parts of the avatar 1400 affected by such experiences are identified at 1810 and the tactile elements of the plurality of tactile elements corresponding to the affected parts of the avatar 1400 are determined at 1812. Based on the experiences of the avatar 1400 the corresponding tactile elements can be activated at 1814. In different embodiments, the plurality of tactile elements 710 can be activated or a subset of the plurality of tactile elements 710 can also be activated. In a further embodiment, different tactile elements can be activated in unique ways to provide various tactile sensations to the user 108.

It can be appreciated that in an embodiment, the process described in flowchart 1800 can be executed by one or more of the immersive experience system 100 and/or the wearable computing system 250. In an embodiment, the process described in the flowchart 1800 can be executed by the wearable computing system 250 in conjunction with the immersive experience system 100 or a remote server (not shown). For example, the wearable computing system 250 can be operable to provide the display at 1802, collect the user input at 1804 and manipulate the avatar 1400 at 1806. The collected user input at 1804 and experiences of the avatar at 1808 that result from such user input can be transmitted by the wearable computing system 250 to the processor 300 or a remote server (not show) which identifies the parts of the avatar 1400 affected by the input at 1810 and the tactile elements corresponding to the affected parts are determined at 1812. In this embodiment, the processors 300 of the immersive experience system 100 can transmit instructions at 1814 to the wearable computing system 250 to activate the tactile elements corresponding to the parts.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A system comprising:
   a sensory deprivation chamber comprising a base configured to accommodate a user and a lid covering a top of the base, the lid configured to raise and lower over a head region of the user;
   a curved display screen that provides visual input to the user, the display screen is attached to a portion of an inner surface of the lid that is proximate to the user's face and extends to cover an entire field of view of the user when the lid is in a lowered position, the entire field of view comprising a field of view greater than 180 degrees relative to the user's head region;
   a processor; and
   a processor readable non-transitory storage medium that comprises programming logic for execution by the processor.

2. The system of claim 1, the base further comprising a suspension liquid wherein the user floats on a surface of the suspension liquid.

3. The system of claim 1, the programming logic comprising: input receiving logic, executed by the processor, to receive at least one input from the user; display manipulation logic, executed by the processor, to manipulate a display on the display screen based on the received input.

4. The system of claim 3, further comprising a tracking module, the tracking module comprises a camera configured to track the user's eyes.

5. The system of claim 4, the input receiving logic further comprising: logic executed by the processor to obtain data related to the tracking of the user's eyes.

6. The system of claim 5, the display manipulation logic further comprising: logic executed by the processor to manipulate the display based on the tracking data of the user's eyes.

7. The system of claim 3, further comprising a visual cortex thought detector configured to be attached to the user, the visual cortex thought detector detects electrical signals associated with the user's thought input.

8. The system of claim 7, the input receiving logic further comprising: logic executed by the processor to obtain data related to the user's thought input.

9. The system of claim 7, the display manipulation logic further comprising: logic executed by the processor to manipulate the display based on the user's thought input.

10. The system of claim 3, the programming logic further comprising: content altering logic, executed by the processor, to alter an attribute of a content item shown on the display screen based on the user input.

11. The system of claim 1, further comprising an audio input device that provides audio input to the user.

12. The system of claim 1, further comprising a wearable computing system configured to be worn by the user.

13. The system of claim 12, wherein the wearable computing system comprises a flexible frame with a plurality of tactile elements affixed thereto, the plurality of tactile elements are configured to provide tactile feedback to the user.

14. The system of claim 13, wherein the flexible frame comprises at least one eye piece that includes a display screen.

15. The system of claim 14, wherein the at least one eye piece comprises two eye pieces.

* * * * *